(12) United States Patent
Sun et al.

(10) Patent No.: US 12,720,038 B2
(45) Date of Patent: Aug. 25, 2026

(54) METHOD OF OPERATING DISPLAY ASSEMBLY AND DISPLAY ASSEMBLY

(71) Applicant: BOE Technology Group Co., Ltd., Beijing (CN)

(72) Inventors: Yanliu Sun, Beijing (CN); Lin Li, Beijing (CN); Pengxia Liang, Beijing (CN); Zheng Fang, Beijing (CN); Yutong Yan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 237 days.

(21) Appl. No.: 18/690,560

(22) PCT Filed: Apr. 27, 2023

(86) PCT No.: PCT/CN2023/091089
§ 371 (c)(1),
(2) Date: Mar. 8, 2024

(87) PCT Pub. No.: WO2024/221319
PCT Pub. Date: Oct. 31, 2024

(65) Prior Publication Data
US 2025/0233973 A1 Jul. 17, 2025

(51) Int. Cl.
*H04N 13/351* (2018.01)
*H04N 13/139* (2018.01)
*H04N 13/305* (2018.01)

(52) U.S. Cl.
CPC ......... *H04N 13/351* (2018.05); *H04N 13/139* (2018.05); *H04N 13/305* (2018.05)

(58) Field of Classification Search
CPC ... H04N 13/351; H04N 13/305; H04N 13/139
See application file for complete search history.

(56) References Cited

U.S. PATENT DOCUMENTS

2013/0208020 A1* 8/2013 Jung .................... H04N 13/383 345/690
2014/0063083 A1* 3/2014 Hamagishi ............. G09G 3/003 345/694

(Continued)

FOREIGN PATENT DOCUMENTS

CN 105376545 A 3/2016
CN 106412556 A 2/2017

(Continued)

OTHER PUBLICATIONS

International Search Report & Written Opinion mailed Nov. 8, 2023, regarding PCT/CN2023/091089.

*Primary Examiner* — Kee M Tung
*Assistant Examiner* — Khoa Vu
(74) *Attorney, Agent, or Firm* — Intellectual Valley Law, P.C.

(57) ABSTRACT

A method of operating a display assembly is provided. The method includes, with respect to a respective viewpoint of J number of viewpoints corresponding to J number of sub-pixels in a respective group of I number of groups in a display panel, rendering K number of subpixel images corresponding to K number of subpixels in the respective group of the I number of groups; and providing the K number of subpixel images to the respective viewpoint, 1≤j≤J, K<J, and I, J, K being integers greater than 1. The respective group of the I number of groups corresponds to J number of viewpoints. A respective subpixel in the respective group corresponds to a respective viewpoint of the J number of viewpoints. A respective viewpoint of the J number of viewpoints corresponds to I number of subpixels from the I number of groups, respectively.

17 Claims, 22 Drawing Sheets

(56) References Cited

U.S. PATENT DOCUMENTS

| | | | | |
|---|---|---|---|---|
| 2016/0050409 | A1* | 2/2016 | Park | H04N 13/383 348/54 |
| 2016/0358532 | A1* | 12/2016 | Wei | G09G 3/2074 |
| 2020/0118360 | A1* | 4/2020 | Kawakatsu | G06V 20/597 |

FOREIGN PATENT DOCUMENTS

| | | | |
|---|---|---|---|
| CN | 112136324 | A | 12/2020 |
| CN | 114040184 | A | 2/2022 |
| KR | 20160029228 | A | 3/2016 |
| WO | 2022058541 | A1 | 3/2022 |

* cited by examiner 1
2
3
4
5
6
7
8
9
10
11
12
13
14
15
16
17
18
19
20
21
22
23
24

RG
1-1
2-1
3-1
4-1
5-1
6-1
7-1
8-1
1-2
2-2
3-2
4-2
5-2
6-2
7-2
8-2
1-3
2-3
3-3
4-3
5-3
6-3
7-3
8-3

RG
rendering
VP2
VP6

METHOD OF OPERATING DISPLAY ASSEMBLY AND DISPLAY ASSEMBLY

CROSS-REFERENCE TO RELATED APPLICATION

This application is a national stage application under 35 U.S.C. § 371 of International Application No. PCT/CN2023/091089, filed Apr. 27, 2023, the contents of which are incorporated by reference in the entirety.

TECHNICAL FIELD

The present invention relates to display technology, more particularly, to a method of operating a display assembly and a display assembly.

BACKGROUND

A glasses-free three-dimensional (3D) display panel is a display panel that utilizes parallax characteristics of human eyes to obtain realistic three-dimensional images with a perception of space and depth without relying on any auxiliary devices (such as 3D glasses, 3D helmets, etc.).

SUMMARY

In one aspect, the present disclosure provides a method of operating a display assembly, comprising with respect to a respective viewpoint of J number of viewpoints corresponding to J number of subpixels in a respective group of I number of groups in a display panel, rendering K number of subpixel images corresponding to K number of subpixels in the respective group of the I number of groups; and providing the K number of subpixel images to the respective viewpoint, $1 \leq j \leq J$, $K<J$, and I, J, K being integers greater than 1; wherein the respective group of the I number of groups corresponds to J number of viewpoints; a respective subpixel in the respective group corresponds to a respective viewpoint of the J number of viewpoints; and a respective viewpoint of the J number of viewpoints corresponds to I number of subpixels from the I number of groups, respectively.

Optionally, the K number of subpixels comprise a subpixel corresponding to the respective viewpoint, and one or more subpixels corresponding to one or more viewpoints adjacent to the respective viewpoint, respectively.

Optionally, the K number of subpixels include a subpixel corresponding to a j-th viewpoint, and at least one of a subpixel corresponding to a (j−1)th viewpoint or a subpixel corresponding to the (j+1)-th viewpoint.

Optionally, the method comprises, with respect to a j-th viewpoint of the J number of viewpoints corresponding to the J number of subpixels in the respective group, rendering at least three subpixel images corresponding to three subpixels in the respective group of the I number of groups; and providing three subpixel images to the respective viewpoint; wherein the three subpixels including a subpixel corresponding to the j-th viewpoint, a subpixel corresponding to a (j−1)th viewpoint, and a subpixel corresponding to the (j+1)-th viewpoint.

Optionally, the I number of groups includes a main group corresponding to a main lobe region and one or more side groups corresponding to one or more side lobe regions of the display assembly, with respect to the J number of viewpoints.

Optionally, a resolution of retina is X number of subpixels; and K≥roundup (J/X), wherein roundup stands for an operation of rounding (J/X) to the nearest integer that is greater than or equal to (J/X).

Optionally, a viewpoint angular width of the respective viewpoint is between a first viewpoint angular width and a second viewpoint angular width; wherein, when the viewpoint angular width of the respective viewpoint is equal to or less than the first viewpoint angular width, a viewer's eye at a respective viewpoint cannot view rendered subpixel images of adjacent subpixels corresponding to adjacent viewpoints; and when the viewpoint angular width of the respective viewpoint is equal to or less than a second viewpoint angular width, a viewer's left eye cannot view rendered subpixel images corresponding to a viewer's right eye, and the viewer's right eye cannot view rendered subpixel images corresponding to the viewer's left eye.

Optionally, J is a number in a range that renders angles of view of visual regions of the I numbers of groups can be spliced with each other to achieve an overall angle of view close to or equal to 180° on a display side of the display assembly, and J is a number in the range that renders a difference between the first viewpoint angular width and the second viewpoint angular width the largest.

Optionally, $$2 * vaw2 \leq 2 * \left(\frac{CA}{2} - EB - \frac{BF}{2}\right);$$

vaw2 stands for the second viewpoint angular width; CA stands for a view angle of a main lobe region; EB stands for an angular width of an eye-box region; and BF stands for the first viewpoint angular width.

Optionally, $$\frac{Plens}{EB} = \frac{f}{L};$$

$P_{lens}$ stands for a pitch of a plurality of lenticular lenses in the display assembly; L is the distance from the plurality of lenticular lenses to a pupil of the viewer; f is the focal length of the plurality of lenticular lenses.

Optionally, a viewer views the image on a best viewing plane, $$2 * vaw2 \leq 2 * \left(\theta m - EB - \frac{BF}{2}\right);$$

θm stands for an angle between the left eye L and the right eye R on the best viewing plane BP with respect to a plurality of lenticular lenses in the display assembly; EB stands for an angular width of an eye-box region; and BF stands for the first viewpoint angular width.

Optionally, the K number of subpixel images corresponding to K number of subpixels are K number of subpixel images having weighted luminance values; a respective weighted luminance value of a respective subpixel image of the K number of subpixel images is equal to w*L; w stands for a respective weight; and L stands for a luminance value of the respective subpixel image at the respective viewpoint.

Optionally, $$w = \frac{Lp}{L};$$

Lp stands for a respective peak luminance value of the respective subpixel image.

In another aspect, the present disclosure provides a display assembly, comprising a display panel and a processor; wherein the processor is configured to, with respect to a respective viewpoint of J number of viewpoints corresponding to J number of subpixels in a respective group of I number of groups in the display panel, render K number of subpixel images corresponding to K number of subpixels in the respective group of the I number of groups, $I \leq j \leq J$, $K<J$, and I, J, K being integers greater than 1; the display panel is configured to display the K number of subpixel images and provide the K number of subpixel images to the respective viewpoint; wherein the respective group of the I number of groups corresponds to J number of viewpoints; a respective subpixel in the respective group corresponds to a respective viewpoint of the J number of viewpoints; and a respective viewpoint of the J number of viewpoints corresponds to I number of subpixels from the I number of groups, respectively.

Optionally, the display assembly further comprises a light modulator, a driver, and an interactive device; wherein the interactive device is configured to determine a coordinate of a viewer's pupil; determine a position of a corresponding subpixel, light emitted from which can enter the viewer's pupil at a position having the coordinate; and transmit information comprising the position of the corresponding subpixel to the driver; wherein the driver is configured to transmit timing signals to the display panel; and the display panel is configured to emit light in the corresponding subpixel and one or more subpixels adjacent to the corresponding subpixel.

Optionally, the processor is configured to, with respect to a j-th viewpoint of the J number of viewpoints corresponding to the J number of subpixels in the respective group, render at least three subpixel images corresponding to three subpixels in the respective group of the I number of groups; the display panel is configured to display the at least three subpixel images and provide the at least three subpixel images to the respective viewpoint; wherein the at least three subpixels including a subpixel corresponding to the j-th viewpoint, a subpixel corresponding to a (j−1)-th viewpoint, and a subpixel corresponding to the (j+1)th viewpoint.

Optionally, the K number of subpixels comprise a subpixel corresponding to the respective viewpoint, and one or more subpixels corresponding to one or more viewpoints adjacent to the respective viewpoint, respectively.

Optionally, the K number of subpixels include a subpixel corresponding to a j-th viewpoint, and at least one of a subpixel corresponding to a (j−1)-th viewpoint or a subpixel corresponding to the (j+1)-th viewpoint.

Optionally, the K number of subpixel images corresponding to K number of subpixels are K number of subpixel images having weighted luminance values; a respective weighted luminance value of a respective subpixel image of the K number of subpixel images is equal to w*L; w stands for a respective weight; and L stands for a luminance value of the respective subpixel image at the respective viewpoint.

Optionally, $$w = \frac{Lp}{L};$$

Lp stands for a respective peak luminance value of the respective subpixel image.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

The present disclosure provides, inter alia, a method of operating a display assembly and a display assembly that substantially obviate one or more of the problems due to limitations and disadvantages of the related art. In one aspect, the present disclosure provides a method of operating a display assembly. In some embodiments, the method of operating a display assembly includes, with respect to a respective viewpoint of J number of viewpoints corresponding to J number of subpixels in a respective group of I number of groups in a display panel, rendering K number of subpixel images corresponding to K number of subpixels in the respective group of the I number of groups; and providing the K number of subpixel images to the respective viewpoint, I≤j≤J, K<J, and I, J, K being integers greater than 1. Optionally, the respective group of the I number of groups corresponds to J number of viewpoints. Optionally, a respective subpixel in the respective group corresponds to a respective viewpoint of the J number of viewpoints. Optionally, a respective viewpoint of the J number of viewpoints corresponds to I number of subpixels from the I number of groups, respectively.

Figures 1, 2:
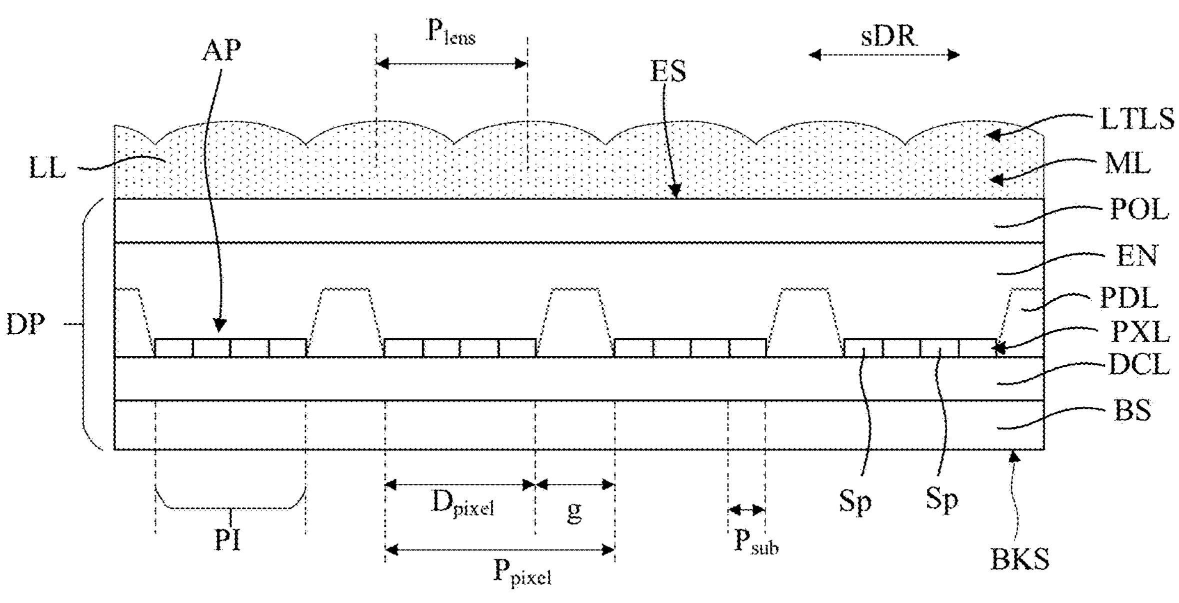
FIG. 1 is a schematic cross-sectional structural diagram of a display assembly in some embodiments according to the present disclosure.
FIG. 2 s a schematic three-dimensional structural diagram of a display assembly in some embodiments according to the present disclosure.

FIG. 1 is a schematic cross-sectional structural diagram of a display assembly according to an embodiment of the present disclosure. FIG. 2 s a schematic three-dimensional structural diagram of a display assembly according to an embodiment of the present disclosure. Referring to FIG. 1 and FIG. 2, the display assembly provided by an embodiment of the present disclosure includes a display panel DP and a lens layer LL. The display panel DP is provided with a plurality of pixel islands PI distributed in an array. A respective pixel island of the plurality of pixel islands PI includes a plurality of subpixels Sp continuously arranged along a set direction sDR. The lens layer LL is disposed on a light exit surface ES of the display panel DP and includes a plurality of lenticular lenses LTLS arranged along a set direction sDR. A pitch $P_{lens}$ of the plurality of lenticular lenses LTLS is not greater than the size $D_{pixel}$ of an aperture AP of each of the pixel islands in the set direction sDR. A pitch $P_{sub}$ of the plurality of subpixels Sp in each pixel island of the plurality of pixel islands PI is smaller than half of the pitch $P_{lens}$ of the plurality of lenticular lenses LTLS. The pitch $P_{lens}$ of the plurality of lenticular lenses LTLS is equal to the sum of the size of each of the plurality of lenticular lenses LTLS in the set direction sDR and a distance between two adjacent lenticular lenses, that is, the distance between the central axes of two adjacent lenticular lenses.

In the display assembly according to the embodiment of the present disclosure, by optimizing design of parameters such as the positional relationship between subpixels in the plurality of pixel islands PI, the subpixel pitch $P_{sub}$ (i.e., the pitch of the plurality of subpixels Sp), the size of the aperture AP of each of the pixel islands and the lenticular lens pitch $P_{lens}$ (i.e., pitch of the plurality of lenticular lenses LTLS), the angle of view of the display assembly can be expanded to nearly 180°, and a glasses-free 3D display with a wide angle of view is realized. In addition, when preparing the display assembly, there is no need to align the plurality of lenticular lenses LTLS with the plurality of pixel islands PI, which can simplify the preparation process of the display assembly.

Referring to FIG. 1 and FIG. 2, the display assembly according to an embodiment of the present disclosure includes the display panel DP and the lens layer LL which are stacked. The display panel DP includes a light exit surface ES and a back surface BKS which are opposite to each other. The light emitted by the display panel DP is emitted from the light exit surface ES. The lens layer LL is disposed on the light exit surface ES of the display panel DP, so that light from different subpixels of the plurality of subpixels Sp can be projected to different regions away from the display panel DP. In this way, a side of the lens layer LL away from the display panel DP is a display side of the display assembly. In order to realize glasses-free 3D display, a display device having the display assembly can be driven according to the following driving method; obtaining positions of both eyes; determining, from subpixels of the pixel islands, image subpixels of the plurality of pixel islands PI according to the positions of both eyes, wherein an image subpixel of a respective pixel island of the plurality of pixel islands PI includes a first subpixel for displaying a left-eye image and a second subpixel for displaying a right-eye image; and driving first subpixels to display left-eye images, and driving second subpixels to display right-eye images. In this way, the left eye can see the left eye images displayed by first subpixels, and the right eye can see the right eye images displayed by first subpixels, so that the viewer can see the 3D images.

The display panel DP according to embodiments of the present disclosure may be an Organic Light-Emitting Device (OLED) display panel, a Polymer Light-Emitting Device (PLED) display panel, a Micro Light Emitting Diode (Micro LED) display panel, a Mini Light Emitting Diode (Mini LED) display panel, a Quantum Dot (QD) display panel, a Liquid Crystal Display (LCD) panel or other types of display panels.

As an example, the display panel DP may be an OLED display panel, which may include a base substrate BS, a driving circuit layer DCL, a pixel layer PXL and an encapsulation layer EN that are stacked in sequence. The pixel layer PXL includes a plurality of pixel islands PI distributed in an array, and any pixel island of the plurality of pixel islands PI includes a plurality of subpixels Sp continuously arranged along the set direction sDR. A respective one of the plurality of subpixels Sp is an organic light emitting diode. The set direction sDR is a direction parallel with a plane where the base substrate BS is located. The driving circuit layer DCL may be provided with pixel driving circuits connected to the plurality of subpixels Sp in a one-to-one correspondence. A respective pixel driving circuit of the pixel driving circuits may be connected to a corresponding subpixel and drive the subpixel independently. Each pixel island of the plurality of pixel islands PI has a light-emitting area, and the light-emitting area is the aperture AP of the pixel island. It can be understood that, in some embodiments, the aperture AP of the pixel island is a set of light-emitting areas of plurality of subpixels Sp of the pixel island.

According to some embodiments, the encapsulation layer EN may be a thin-film encapsulation layer, which may include an organic material layer and an inorganic material layer which are stacked, so as to avoid external water and oxygen from invading the plurality of pixel islands PI and causing the plurality of subpixels Sp to fail.

According to some embodiments, the pixel layer PXL may further include a pixel definition layer PDL. The pixel definition layer PDL is formed with pixel openings arranged in a one-to-one correspondence with the plurality of pixel islands PI. Any pixel opening may expose a corresponding pixel island aperture. In some embodiments, the pixel definition layer PDL may be used to define a light emitting area of each pixel island of the plurality of pixel islands PI, that is, the pixel definition layer PDL defines the aperture AP of the pixel islands. In other embodiments of the present disclosure, the pixel definition layer PDL may be used to isolate light from different pixel islands to avoid crosstalk between the plurality of pixel islands PI.

In some embodiments, the display panel DP may further include a circular polarizer POL. The circular polarizer POL may be disposed on a side of the encapsulation layer EN away from the base substrate BS to reduce the influence of ambient light on the display effect.

Figure 3:
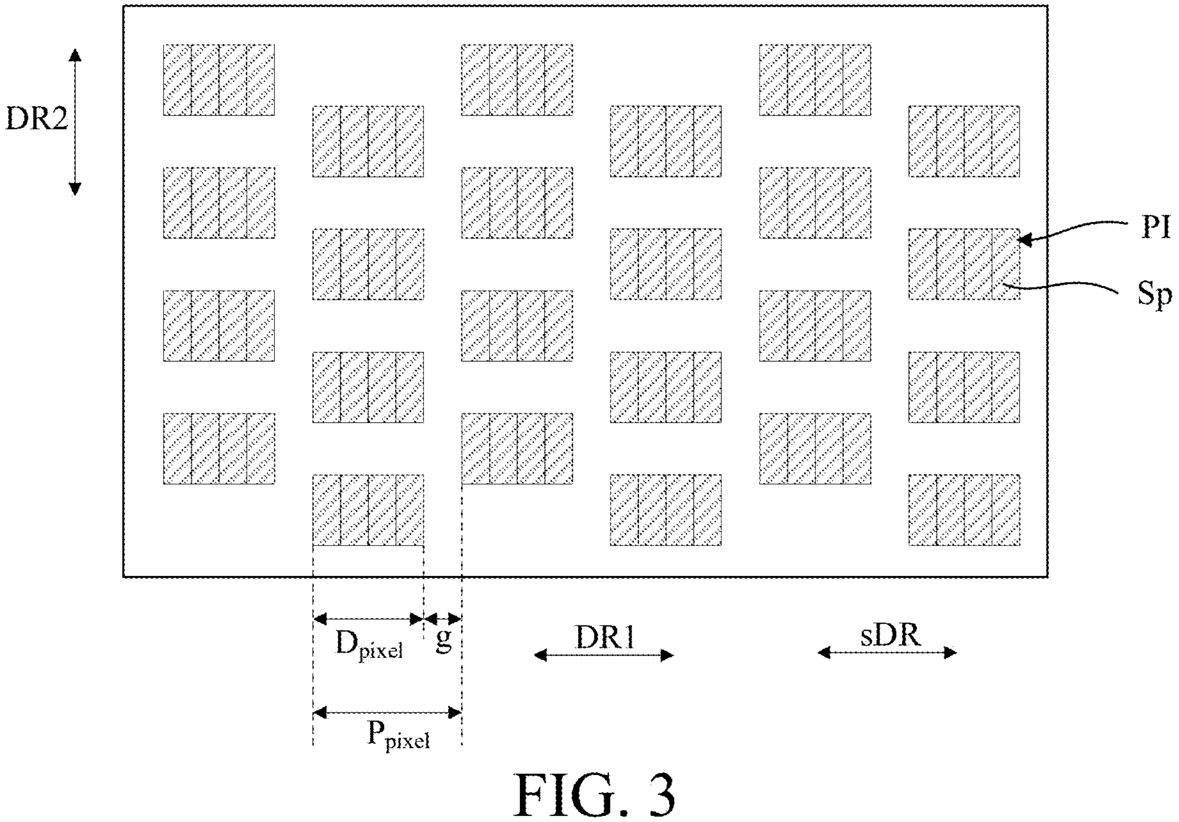
FIG. 3 is a schematic diagram showing distribution of pixel islands in some embodiments according to the present disclosure.
Figure 4:
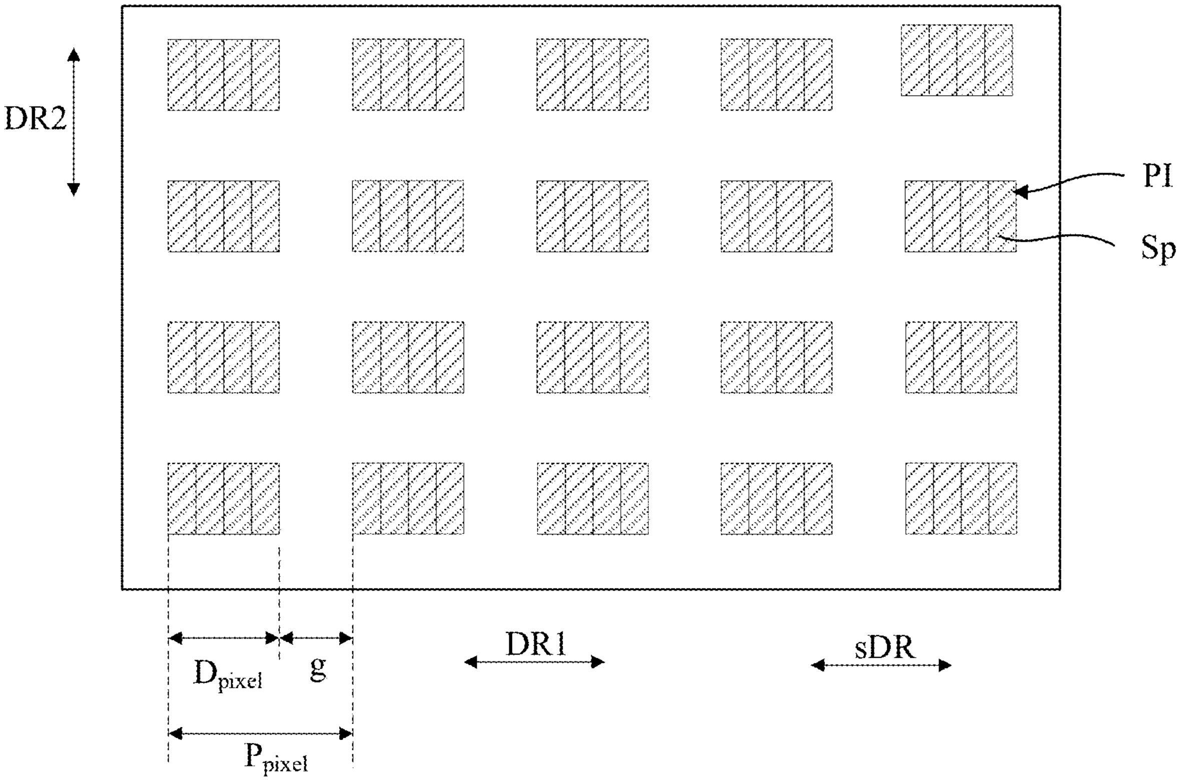
FIG. 4 is a schematic diagram showing distribution of pixel islands in some embodiments according to the present disclosure.

FIG. 3 is a schematic diagram showing distribution of pixel islands in some embodiments according to the present disclosure. FIG. 4 is a schematic diagram showing distribution of pixel islands in some embodiments according to the present disclosure. In some embodiments, referring to FIG. 3 and FIG. 4, in the display assembly according to embodiments of the present disclosure, the aperture AP of each pixel island may be shaped as a parallelogram. The long side direction of the opening of the pixel island PI may be a first direction DR1, and the short side direction may be a second direction DR2. The first direction DR1 and the second direction DR2 are both directions parallel to the light exit surface ES of the display panel DP. In other words, the short side direction of the aperture AP of the pixel island may be parallel to the extending direction of the lenticular lenses. In some embodiments, the second direction DR2 is perpendicular to the set direction sDR, and the first direction DR1 is the same as the set direction sDR. Thus, the aperture AP of the pixel island may be a rectangle. In another embodiment of the present disclosure, the set direction sDR intersects the first direction DR1.

Further, in an embodiment of the present disclosure, the first direction DR1 is the same as a row direction of an array of subpixels in the display panel DP, and the second direction DR2 is the same as a column direction of the array of subpixels in the display panel DP. In one example, the row direction of the array of subpixels in the display panel DP may be an extending direction of gate lines of the display panel DP, and the column direction of the array of subpixels in the display panel DP may be an extending direction of data lines of the display panel DP.

Further, in an embodiment of the present disclosure, the plurality of pixel islands PI may be arranged in multiple columns, and any pixel island column includes a plurality of pixel islands PI arranged along the second direction DR2. In this way, the crosstalk between the left-eye view and the right-eye view can be reduced, and the glasses-free 3D display effect can be improved. In addition, this can also facilitate the simultaneous determination of the image subpixels of pixel islands in the same pixel island column, which simplifies the driving method of the display assembly.

Further, the plurality of pixel islands PI may also be arranged in multiple rows, and any pixel island row includes a plurality of pixel islands PI arranged along the first direction DR1.

Exemplarily, in another embodiment of the present disclosure, as shown in FIG. 3, the plurality of pixel islands PI are arranged as a plurality of pixel island rows and a plurality of pixel island columns. A respective pixel island column includes a plurality of pixel islands PI arranged along the second direction DR2, and a respective pixel island row includes a plurality of pixel islands PI arranged along the first direction DR1. Two adjacent pixel islands in the same pixel island row are respectively located in two pixel island rows separated by one pixel island row, and two adjacent pixel islands in the same pixel island row are respectively located in two pixel island columns separated by one pixel island column.

For another example, in an embodiment of the present disclosure, as shown in FIG. 4, the plurality of pixel islands PI are arranged as a plurality of pixel island rows and a plurality of pixel island columns. A respective pixel island column includes a plurality of pixel islands PI arranged alone the direction DR2, and a respective pixel island row includes a plurality of pixel islands PI arranged along the first direction DR1. Two adjacent pixel islands of the plurality of pixel islands PI in the same pixel island column are located in two adjacent pixel island rows.

According to some embodiments, the light emitting colors of plurality of subpixels Sp within a same pixel island are the same. For example, subpixels in the same pixel island all emits red light, or all emits green light, or all emits blue light.

According to some embodiments, the plurality of pixel islands PI of the display panel DP include red pixel islands for emitting red light, green pixel islands for emitting green light, and blue pixel islands for emitting blue light. Subpixels in each red pixel island all emit red light; subpixels in each green pixel island all emit green light; and subpixels in each blue pixel island all emits blue light.

Figure 6:
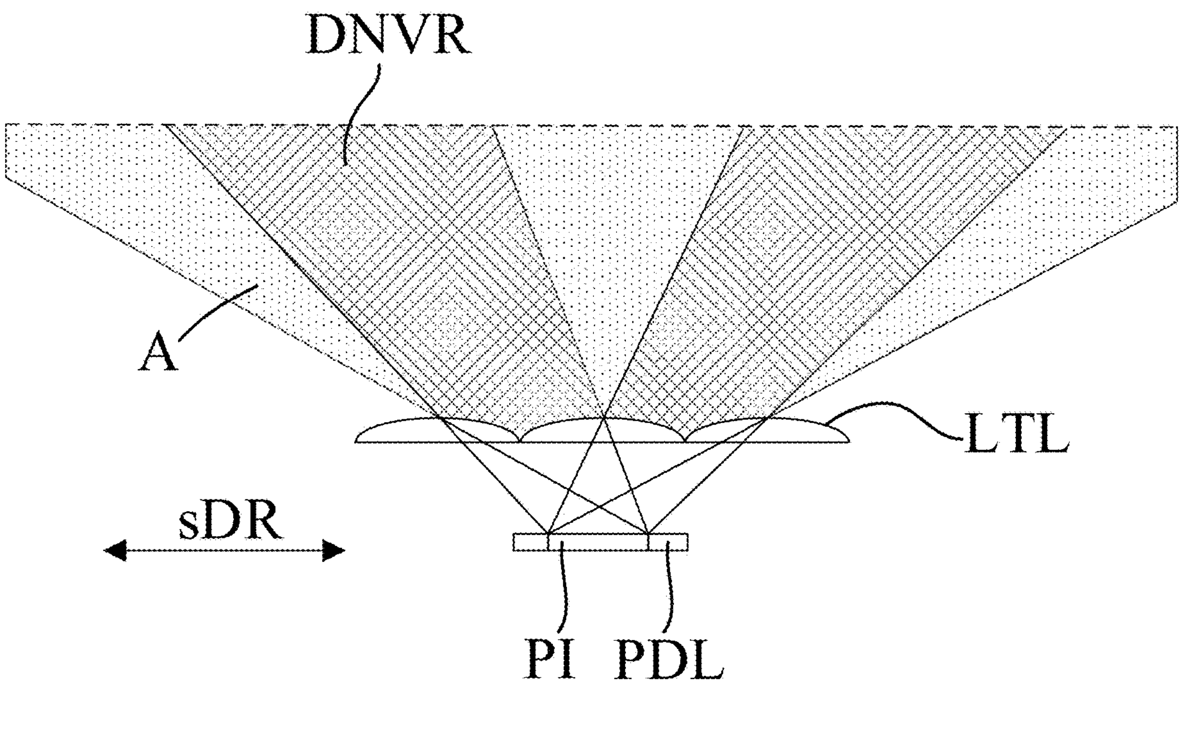
FIG. 6 is a schematic diagram showing distribution of light projected by pixel islands through lenticular lenses when a lenticular lens pitch is greater than the size of an opening of each of the pixel islands in a set direction.
Figure 7:
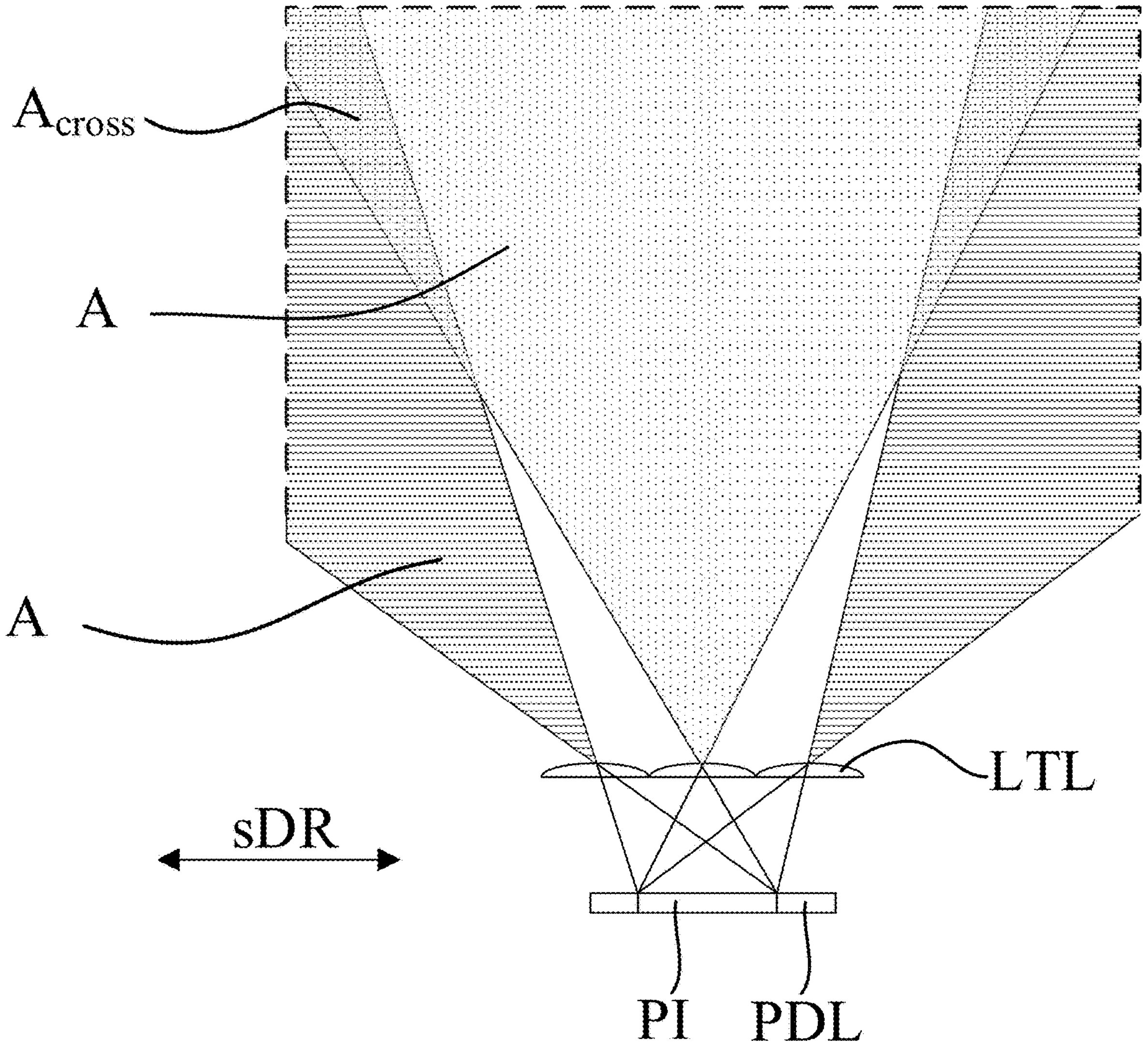
FIG. 7 is a schematic diagram showing distribution of light projected by one pixel island through lenticular lenses in a display assembly in some embodiments according to the present disclosure.
Figure 8:
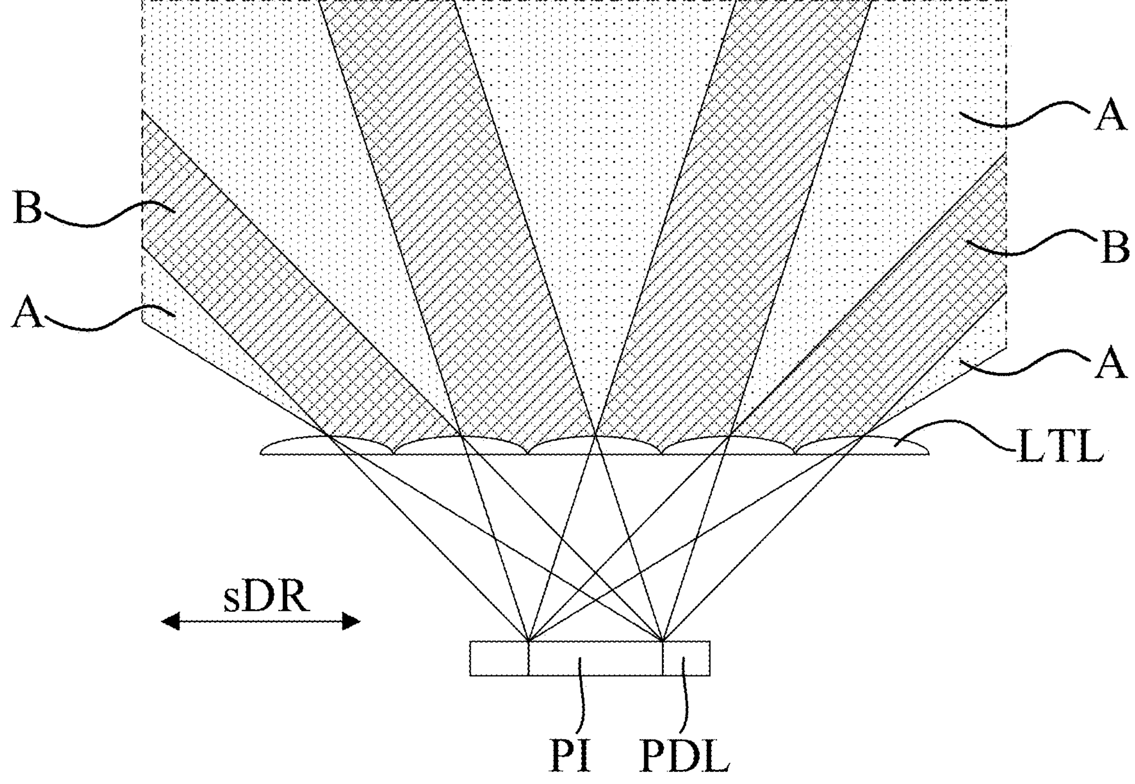
FIG. 8 is a schematic diagram showing distribution of light projected by one pixel island through lenticular lenses in a display assembly according to in some embodiments according to the present disclosure.

FIG. 6 is a schematic diagram showing distribution of light projected by pixel islands through lenticular lenses when a lenticular lens pitch is greater than the size of an opening of each of the pixel islands in a set direction. FIG. 7 is a schematic diagram showing distribution of light projected by one pixel island through lenticular lenses in a display assembly in some embodiments according to the present disclosure. FIG. 8 is a schematic diagram showing distribution of light projected by one pixel island through lenticular lenses in a display assembly in some embodiments according to the present disclosure. In the display assembly according to embodiments of the present disclosure, referring to FIG. 6 to FIG. 8, any pixel island of the plurality of pixel islands PI can project a corresponding visual region A on the display side through a respective one of the lenticular lenses. The visual region A may be a fan-shaped spatial region on the display side of the display assembly. In a cross-section perpendicular to the light exit surface ES of the display panel DP and parallel to the set direction sDR, the cross-section of the visual region A is a radial area formed by two sides. One pixel island of the plurality of pixel islands PI corresponds to a plurality of visual regions A, and one visual region A corresponds to one pixel island of the plurality of pixel islands PI and a lenticular lens LTL at the same time. When a pixel island of the plurality of pixel islands PI emits light, the light emitted by the pixel island arrives at corresponding visual regions A through the lenticular lens LTL, and does not go outside of corresponding visual regions A. In other words, the region on the display side irradiated by the light which is emitted by a pixel island of the plurality of pixel islands PI and passes through a lenticular lens LTL is a visual region A corresponding to the pixel island and the lenticular lens LTL. In the display assembly according to embodiments of the present disclosure, each visual region A corresponding to a pixel island of the plurality of pixel islands PI is a continuous region, and each visual region A corresponds to an angle of view. The angles of view of visual regions A of the plurality of pixel islands PI can be spliced with each other to achieve an overall angle of view close to or equal to 180° on the display side. In other words, the plurality of pixel islands PI can be seen at any angular position on the light exit side.

Figure 5:
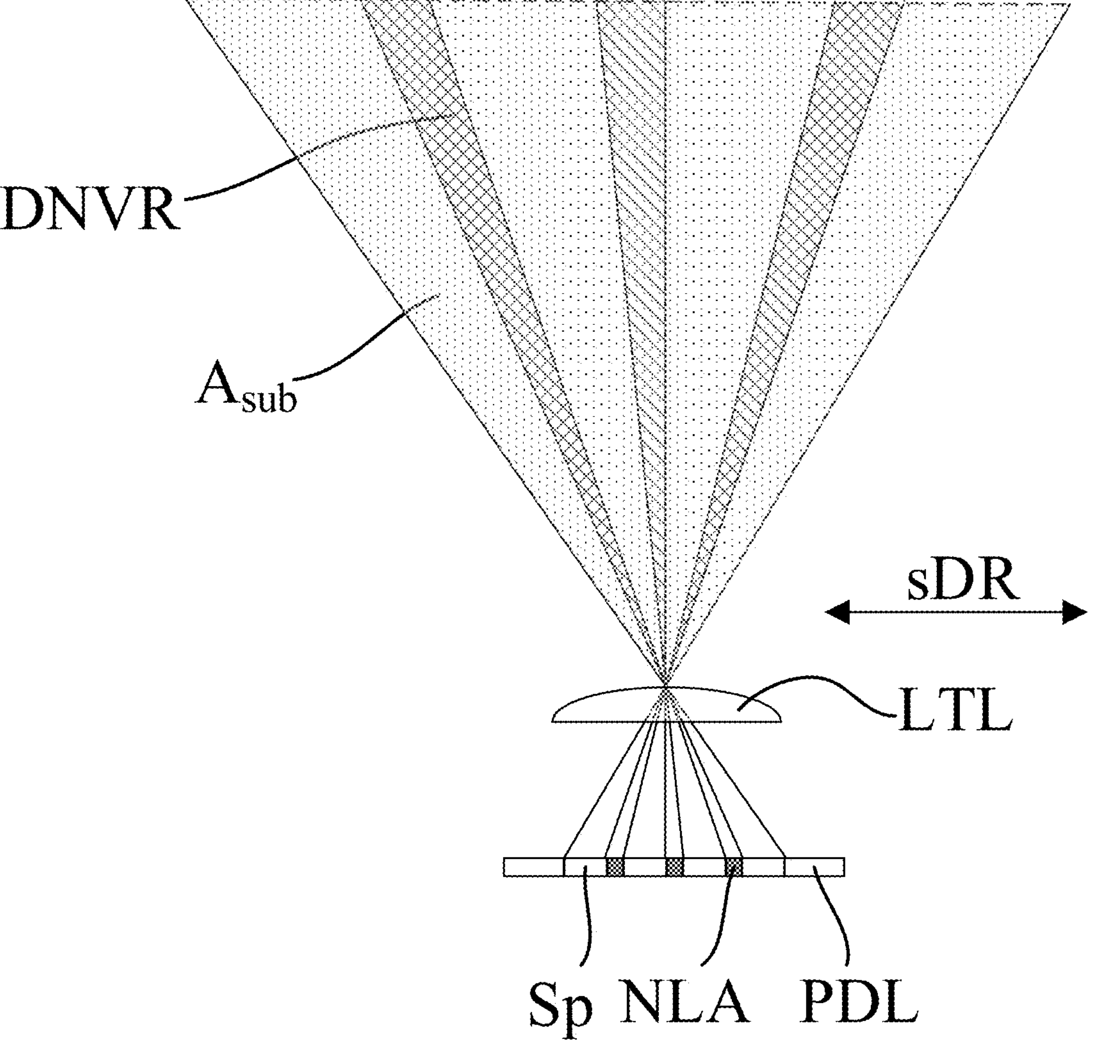
FIG. 5 is a schematic diagram showing distribution of light projected by pixel islands through lenticular lenses when a gap is provided between subpixels.
Figure 11:
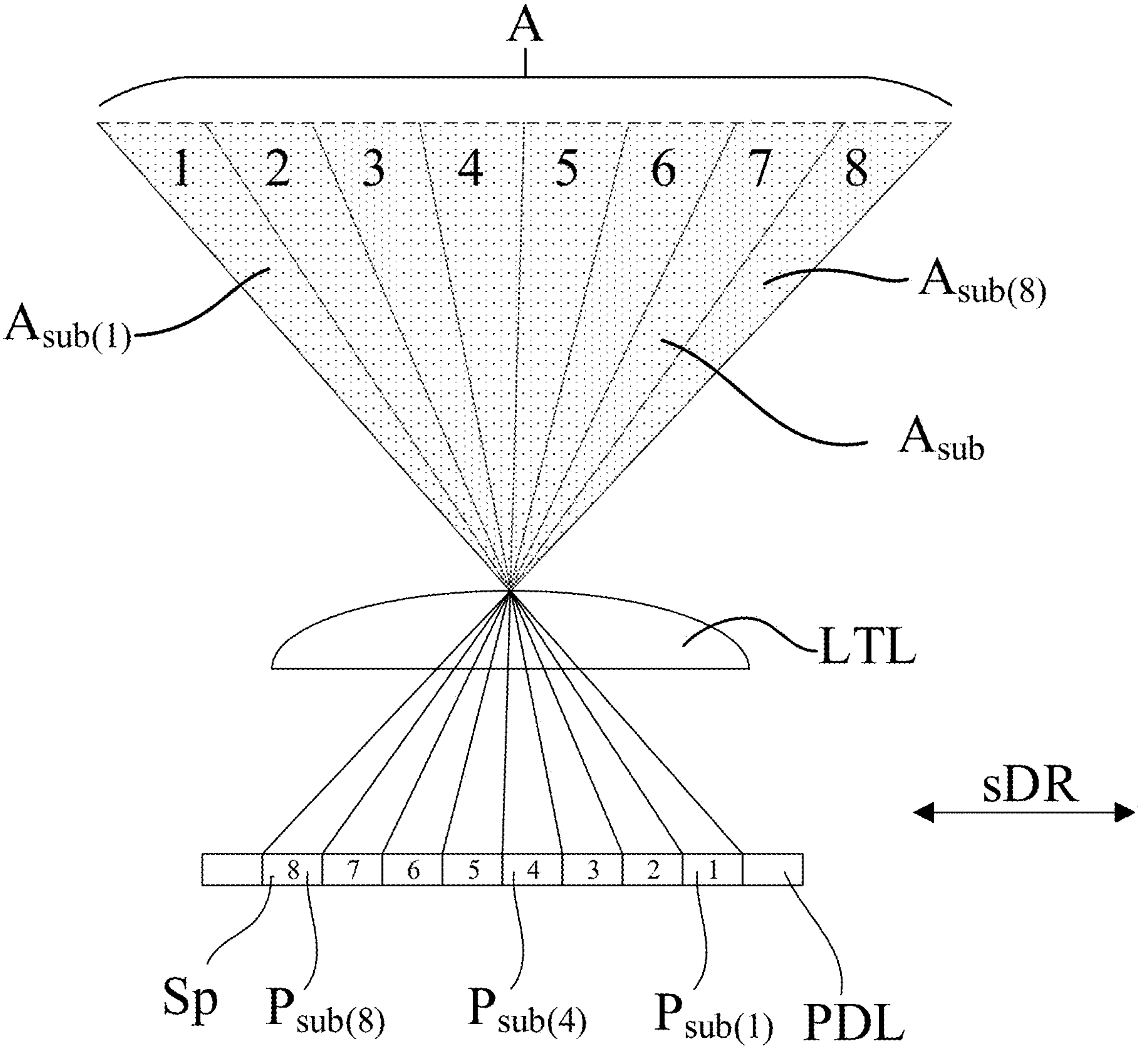
FIG. 11 is a schematic diagram showing distribution of light projected by subpixels of one pixel island through one lenticular lens in a display assembly in some embodiments according to the present disclosure.

FIG. 5 is a schematic diagram showing distribution of light projected by pixel islands through lenticular lenses when a gap is provided between subpixels. FIG. 11 is a schematic diagram showing distribution of light projected by subpixels of one pixel island through one lenticular lens in a display assembly in some embodiments according to the present disclosure. As shown in FIG. 5 and FIG. 11, a pixel island of the plurality of pixel islands PI includes a plurality of subpixels Sp arranged along the set direction sDR, and accordingly, any visual region A corresponding to the pixel island includes a plurality of visual sub-regions A, which correspond to subpixels of the pixel island one to one. A respective one of the plurality of visual sub-regions $A_{sub}$ of the pixel island is a spatial region projected by a subpixel of the pixel island through a lenticular lens LTL. The respective visual sub-region may be a fan-shaped region on the display side of the display assembly. In a cross-section perpendicular to the light exit surface ES of the display panel DP and parallel to the set direction sDR, the cross section of the respective visual sub-region is a radial area formed by two sides. One subpixel corresponds to a plurality of visual sub-regions Aa, and one visual sub-region simultaneously corresponds to one subpixel and a lenticular lens LTL. When a subpixel of the pixel island emits light, light from the subpixel can be irradiated to its visual sub-regions through the lenticular lenses LTL, but not to other regions. In other words, the region on the display side irradiated by the light which is emitted by a subpixel and passes through a lenticular lens LTL is a visual sub-region corresponding to the subpixel and the lenticular lens LTL. Referring to FIG. 11, FIG. 11 exemplarily provides a case where one pixel island of the plurality of pixel islands PI includes 8 subpixels, the x-th subpixel is the subpixel $P_{sub(x)}$, and x is a positive integer from 1 to 8. A corresponding visual region A is projected by the pixel island through a lenticular lens LTL shown in the figure, and a corresponding visual sub-region $A_{sub(x)}$ is projected by any subpixel $P_{sub(x)}$ through the lenticular lens LTL.

Referring to FIG. 11, in the display assembly according to embodiments of the present disclosure, subpixels in the pixel island of the plurality of pixel islands PI are continuously arranged along the set direction sDR. In the pixel island, the distance between two adjacent subpixels along the set direction sDR is zero; along the set direction sDR, the size of the each subpixel is equal to the pitch $P_{sub}$ of the subpixels. Referring to FIG. 5, when a non-luminous area NLA exists between two adjacent subpixels, the non-luminous area NLA forms a divergent non-visual region DNVR on the display side through the lens layer LL. The width of the divergent non-visual region DNVR increases in a direction away from the display assembly. The width of the divergent non-visual region DNVR refers to the size of the divergent non-visual region DNVR in the set direction sDR. Since the width of the divergent non-visual region DNVR may increase in a direction away from the display assembly, its width may exceed the width of the eye at a normal viewing distance. When the pupil of the human eye is located in the divergent non-visual region DNVR, no subpixel in the pixel island can be seen, which makes the display assembly unable to achieve a glasses-free 3D display effect close to 180° on the display side. However, in the display assembly according to embodiments of the present disclosure, the subpixels in the pixel island are arranged continuously, which can avoid the non-luminous area NLA between two adjacent subpixels, and prevent the non-luminous area NLA from forming the divergent non-visual region DNVR on the display side. In a cross-section perpendicular to the light exit surface 130 of the display panel DP and parallel to the set direction sDR, the width of the divergent non-visual region DNVR increases as the distance from the display assembly increases.

According to some embodiments, within the same pixel island, the number of subpixels arranged along the set direction sDR is 4 to 12. In this way, there can be enough subpixels to display the left-eye images and the right-eye images respectively while avoiding too many subpixels to increase the cost of display assembly, and accordingly the pixel density of the display panel DP can be reduced.

In the display assembly according to embodiments of the present disclosure, as shown in FIG. 1, the lens layer LL may include a matrix layer ML and a plurality of lenticular lenses LTLS disposed on a side of the matrix layer ML away from the display panel DP. Preferably, the material of the matrix layer ML is the same as the material of the plurality of lenticular lenses LTLS, and the matrix layer ML and the plurality of lenticular lenses LTLS may be formed as a one-piece structure.

According to some embodiments, the plurality of pixel islands PI are located at a focal plane of the plurality of lenticular lenses LTLS. In this way, the crosstalk between the left-eye images seen by the left eye and the right-eye images seen by the right eye can be reduced, thereby improving the effect of 3D display. In addition, arranging the plurality of pixel islands PI at a focal plane of the plurality of lenticular lenses LTLS can also facilitate determination of a farthest viewing limit and a nearest viewing limit of the display assembly, and the determination of the first subpixels for displaying the left eye images and the second subpixels for displaying the right eye images, which helps reduce the complexity of the driving method of the display device to which the display assembly is applied.

In embodiments of the present disclosure, the focal plane of the lenticular lenses is a plane where the focal points of the same side of the lenticular lenses are located, that is, a plane passing through the focal points of the lenticular lenses and perpendicular to the main optical axes of the lenticular lenses.

In the display assembly according to embodiments of the present disclosure, referring to FIG. 1, along the set direction sDR, the $P_{lens}$ of the plurality of lenticular lenses LTLS is not greater than the size $D_{pixel}$ of the aperture AP of each of the pixel islands. Along the set direction sDR, the size $D_{pixel}$ of the aperture AP of each of the pixel islands is equal to the pitch $P_{pixel}$ of the pixel islands minus the width g between two adjacent pixel islands of the plurality of pixel islands PI in the pixel definition layer PDL. In some embodiments of the present disclosure, the pitch $P_{lens}$ of the plurality of lenticular lenses LTLS is equal to the sum of the size of each of the plurality of lenticular lenses LTLS in the set direction sDR and the distance between two adjacent lenticular lenses, that is, it may be equal to the distance in the set direction sDR between main optical axes of two adjacent lenticular lenses. Referring to FIG. 6, along the set direction sDR, if the pitch $P_{lens}$ of the plurality of lenticular lenses LTLS is greater than the size $D_{pixel}$ of the aperture AP of the pixel island in the set direction sDR, then a divergent non-visual region DNVR is formed between two adjacent boundaries of two adjacent visual regions A corresponding to the pixel island. When the pupil is in the divergent non-visual region DNVR, the eye cannot see any of the plurality of pixel islands PI. Since the pitch $P_{lens}$ the plurality of lenticular lenses LTLS in embodiments of the present of disclosure is not greater than the size $D_{pixel}$ of the aperture AP of each pixel island in the set direction sDR, it can be ensured that no divergent non-visual region DNVR is formed between the respective visual regions A of the pixel island of the plurality of pixel islands PI, so as to avoid the situation that the eyes cannot see the pixel island in the divergent non-visual region DNVR (which may affect the glasses-free 3D display effect). Correspondingly, it can be ensured that the angles of view of the visual regions A of the pixel island can be spliced with each other, and the pixel island can be seen from any angle on the light-emitting side.

In an embodiment of the present disclosure, along the set direction sDR, the pitch $P_{lens}$ of the plurality of lenticular lenses LTLS is equal to the size $D_{pixel}$ of the aperture AP of the pixel island in the set direction sDR.

Figure 9:
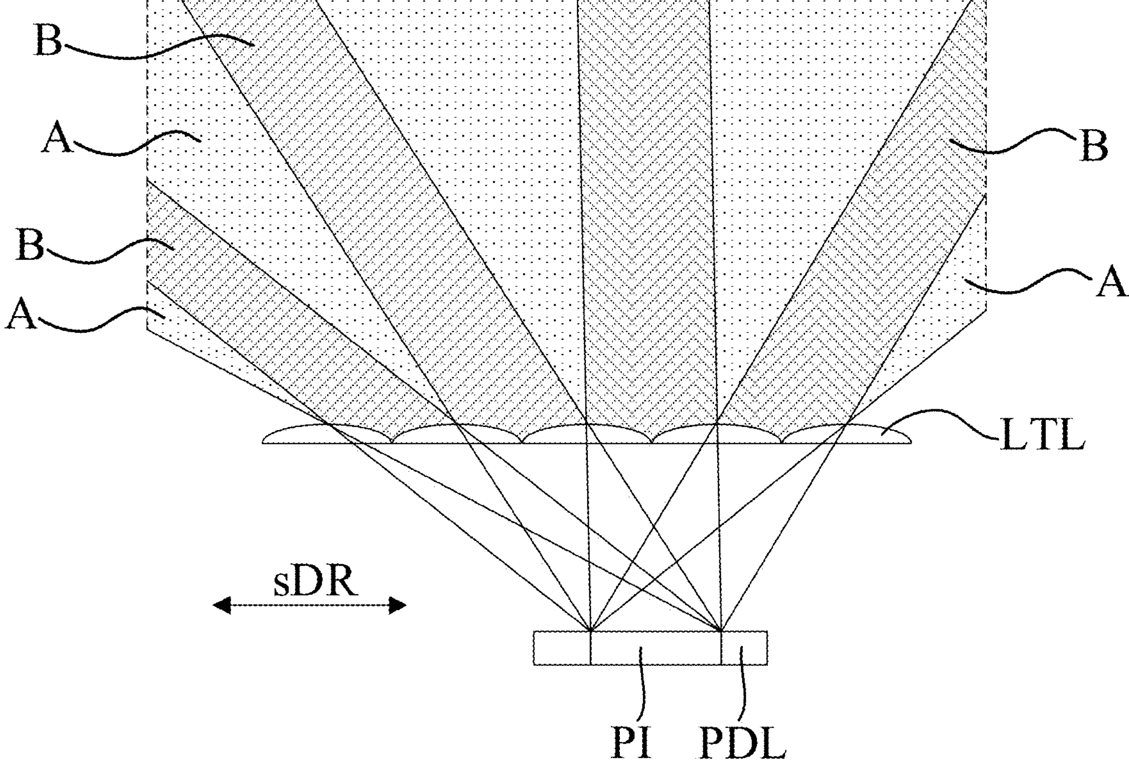
FIG. 9 s a schematic diagram showing distribution of light projected by one pixel island through lenticular lenses in a display assembly according to an embodiment of the present disclosure; wherein, the position of the pixel island in FIG. 9 is shifted by a half of the lenticular lens pitch in the set direction relative to FIG. 8.
Figure 10:
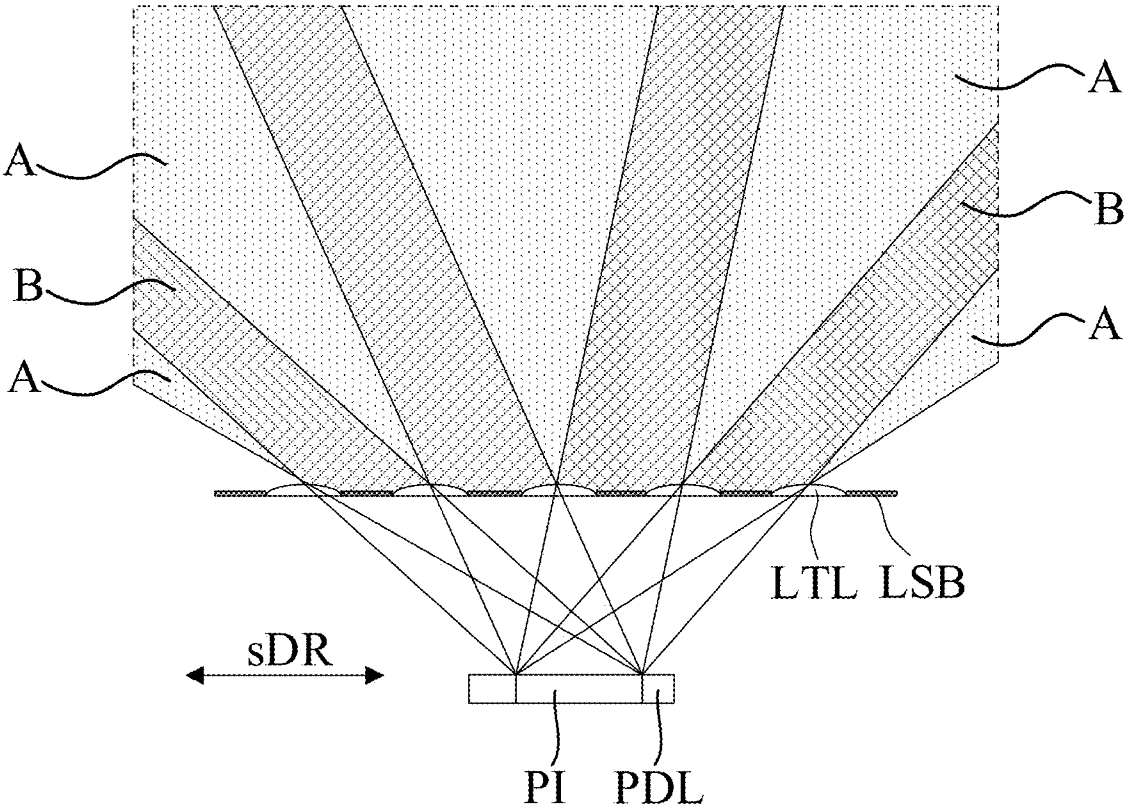
FIG. 10 is a schematic diagram showing distribution of light projected by one pixel island through lenticular lenses in a display assembly in some embodiments according to the present disclosure.

FIG. 9 s a schematic diagram showing distribution of light projected by one pixel island through lenticular lenses in a display assembly according to an embodiment of the present disclosure; wherein, the position of the pixel island in FIG. 9 is shifted by a half of the lenticular lens pitch in the set direction relative to FIG. 8. FIG. 10 is a schematic diagram showing distribution of light projected by one pixel island through lenticular lenses in a display assembly in some embodiments according to the present disclosure. Referring to FIG. 8 to FIG. 10, two adjacent boundaries of two adjacent visual regions A corresponding to the pixel island are parallel to each other. Therefore, the angles of view corresponding to the two adjacent visual regions A corresponding to the pixel island can be continuous, and accordingly the angles of view corresponding to visual regions A corresponding to the pixel island can successively form a total angle of view of 180°. Correspondingly, a strip-shaped non-visual region B is formed between two adjacent visual regions A corresponding to the pixel island, and the size of the strip-shaped non-visual region B in the set direction sDR is equal to the size $D_{pixel}$ of the aperture AP of the pixel island in the set direction sDR. The strip-shaped non-visual region B is presented as a strip-shaped area, and in the cross-section perpendicular to the light exit surface 130 of the display panel DP and parallel to the set direction sDR, the cross-section of the strip-shaped non-visual region B is an area formed by two parallel sides and located on the display side. Since the aperture AP of the pixel island is very small compared to the size of the pupil and is at retinal level, the existence of the strip-shaped non-visual region B will not make any pixel island completely invisible to the eyes, and thus the visual regions A of the pixel island can be equivalently considered as being in a tightly connected state on the display side. In other words, the strip-shaped non-visual region B does not affect the normal display of the display assembly.

In FIG. 8 and FIG. 9, the alignment positions of the plurality of lenticular lenses and the plurality of pixel islands PI are different, but both the arrangements in FIG. 8 and FIG. 9 can make visual regions A of the pixel island equal to the closely connected state on the display side. Therefore, in the display assembly according to embodiments of the present disclosure, no matter whether the plurality of lenticular lenses and the plurality of pixel islands PI are aligned or not, the total angle of view of the display assembly remains unchanged. When manufacturing the display assembly, the lenticular lenses and the plurality of pixel islands PI do not need to be aligned, which can simplify the manufacturing process of the display assembly.

According to some embodiments, the size of each pixel island in the set direction sDR is equal to 10 to 100 microns. In this way, it can be avoided that the size of each pixel island in the set direction sDR is too large and the width of the strip-shaped non-visual region B is too large, and the size of the pixel island in the set direction sDR can be prevented from being too small which may lead to the difficulties in preparation of pixels.

For the display assembly of this embodiment, when 3D display is required, the image subpixels of any pixel island can be determined according to the following method. From visual sub-regions $A_{sub}$ of the pixel island, a visual sub-region $A_{sub}$ where the pupil 410 of the left eye is located is determined as a first visual sub-region $A_{sub}$. A subpixel corresponding to the first visual sub-region $A_{sub}$ is determined as a first subpixel of the pixel island. From visual sub-regions $A_{sub}$ of the pixel island, a visual sub-region $A_{sub}$ where the pupil 420 of the right eye is located is determined as a second visual sub-region $A_{sub}$. A subpixel corresponding to the second visual sub-region $A_{sub}$ is determined as a second subpixel of the pixel island.

In this embodiment, the corresponding visual regions A of one pixel island do not overlap, and thus in the 3D visual space, the pupil of one eye will not see a same subpixel of the pixel island through two different lenticular lenses. Based on this, when 2D display is required, the plurality of subpixels Sp can be made to display 2D pictures, so that the viewer can see the 2D pictures, and the defect of display brightness fluctuations in the set direction sDR will not occur. In other words, the display assembly of this embodiment can also realize 2D display with uniform brightness by driving the plurality of subpixels Sp at the same time to display 2D pictures.

In another embodiment of the present disclosure, along the set direction sDR, the pitch $P_{lens}$ of the plurality of lenticular lenses LTLS is smaller than the size $D_{pixel}$ of the aperture AP of each pixel island in the set direction sDR, and then as shown in FIG. 7, two adjacent boundaries of two adjacent visual regions A corresponding to the pixel island intersect. That is, an overlapping region $A_{cross}$ exists between two adjacent visual regions A, and the overlapping region $A_{cross}$ corresponds to one pixel island and two lenticular lenses at the same time. Correspondingly, the angles of view corresponding to the two adjacent visual regions A corresponding to the pixel island partially overlap, so that the angles of view corresponding to the respective visual regions A corresponding to the pixel island can be sequentially overlapped to form a total angle of view of 180° to realize 3D display with wide angle of view.

In an embodiment of the present disclosure, along the set direction sDR, the pitch $P_{lens}$ of the plurality of lenticular lenses LTLS is not smaller than half of the size $D_{pixel}$ of the aperture AP of each pixel island in the set direction sDR, and not greater than the size $D_{pixel}$ of the aperture AP of the pixel island in the set direction sDR. In this way, an overlapping region $A_{cross}$ is formed between two adjacent visual regions A of the pixel island, and an overlapping region $A_{cross}$ is not formed between two non-adjacent visual regions A. In this way, on the one hand, the size of each lenticular lens in the set direction sDR can be increased to improve the manufacturing convenience of the plurality of lenticular lenses LTLS. On the other hand, it is convenient to determine the plurality of subpixels Sp in the pixel island as image subpixels corresponding to the eyes according to eye positions. In addition, this embodiment can improve the 3D visual space of the display assembly. The image subpixels corresponding to the eyes include at least one first subpixel corresponding to the left eye and used for displaying the left-eye images and at least one second subpixel corresponding to the right eye and used for displaying the right-eye images, and the number of the at least one first subpixel is one or two, and the number of the at least one second subpixel is one or two.

For the display assembly of this embodiment, the image subpixels of any pixel island can be determined according to the following method:

If the pupil of one eye is not located in the overlapping region $A_{cross}$ of the two visual regions A, a subpixel corresponding to a visual sub-region $A_{sub}$ where the pupil of the eye is located is the image subpixel corresponding to the eye. For example, if the pupil of the left eye is not located in the overlapping region $A_{cross}$ of the two visual regions A, a subpixel corresponding to a visual sub-region $A_{sub}$ where the pupil of the left eye is located is the first subpixel. For another example, if the pupil of the right eye is not located in the overlapping region $A_{cross}$ of the two visual regions A, a subpixel corresponding to a visual sub-region $A_{sub}$ where the pupil of the right eye is located is the second subpixel.

If the pupil of one eye is located in the overlapping region $A_{cross}$ of the visual regions A corresponding to two adjacent lenticular lenses, a first candidate visual sub-region $A_{sub}$ and a second candidate visual sub-region $A_{sub}$ corresponding to the pupil of the eye are determined respectively. The first candidate visual sub-region $A_{sub}$ is a visual sub-region $A_{sub}$ where the pupil of the eye is located and which corresponds to one of the plurality of lenticular lenses LTLS, that is, the first candidate visual sub-region $A_{sub}$ belongs to one of the two overlapping visual regions A. The second candidate visual sub-region $A_{sub}$ is a visual sub-region $A_{sub}$ where the pupil of the eye is located and which corresponds to another lenticular lens, that is, the second candidate visual sub-region $A_{sub}$ belongs to the other visual region A of the two overlapping visual regions A. In this case, the pupil of the other eye must not be in the overlapping region $A_{cross}$, otherwise the eye will exceed the farthest viewing limit of the display assembly. A visual sub-region $A_{sub}$ where the pupil of the other eye is located is determined as an anchor visual sub-region $A_{sub}$. On the connection line connecting the pupils of the two eyes, a candidate visual sub-region $A_{sub}$ that is farther from the anchor visual sub-region $A_{sub}$ is selected from the first candidate visual sub-region $A_{sub}$ and the second candidate visual sub-region $A_{sub}$ as a target visual sub-region $A_{sub}$ corresponding to the eye, and the subpixel corresponding to the target visual sub-region $A_{sub}$ is determined as the image subpixel of the eye.

In some embodiments, in the display assembly according to embodiments of the present disclosure, the size of each lenticular lens in the set direction sDR is equal to the pitch $P_{lens}$ of the plurality of lenticular lenses LTLS. That is, referring to FIG. 1, two adjacent lenticular lenses are connected to each other, and the filling rate of the plurality of lenticular lenses LTLS is 100%. In this way, not only the width of each lenticular lens in the set direction sDR can be increased to facilitate the preparation of the plurality of lenticular lenses LTLS, but also the light shielding bars located between the plurality of lenticular lenses LTLS in the lens layer can be avoided, and thus the display assembly can have greater light output efficiency and display brightness.

In alternative embodiments, the lens layer LL may further include a plurality of light shielding bars LSB arranged along the set direction sDR. The light shielding bars LSB and the plurality of lenticular lenses LTLS are alternately arranged. In other words, there is a gap between two adjacent lenticular lenses, and a light shielding bar LSB for shielding light is disposed in the gap, so as to avoid stray light emitted from the gap which may affect the display effect.

The inventors of the present disclosure discover that there are several contradictory relationships among parameters of the related naked-eye light field three-dimensional display apparatuses. The first contradictory relationship exists between crosstalk and Moiré pattern. When a relatively large cross-talk exists, occurrence of Moiré pattern is suppressed. However, a relatively large cross-talk leads to image blur and adverse reactions such as dizziness and nausea in a viewer. When the cross-talk is relatively small, Moiré pattern is typically manifested. However, a relatively small cross-talk reduces the image interference between two eyes, enabling the viewer to view a clearer three-dimensional image. The second contradictory relationship exists between the number of viewpoints and the resolution of viewpoints. The higher number of viewpoints, the lower the resolution of viewpoints is, and vice versa. A relatively small number of viewpoints is not conducive to motion viewing and leads to viewpoint jumps. A relatively lower resolution of viewpoints leads to grainy feeling. The third contradictory relationship exists between motion parallax and visible space. In order to achieve a smooth motion viewing effect, a motion parallax of less than 1° is usually required to avoid viewpoint jumps during motion viewing. The motion parallax is related to the angle spectrum width of the viewpoint crosstalk. As the viewing angle increases, the viewpoint crosstalk increases, affecting and limiting the expansion of visible space.

The present disclosure provides a high resolution light field three-dimensional display assembly that enables smooth motion parallax. The display assembly according to the present disclosure is compatible with various alternative pixel arrangements and lens structures. The display assembly according to the present disclosure achieves a relatively high resolution of viewpoints and a relatively large number of viewpoints at the same time, through resolution compensation, eliminating grainy feeling when viewing the three-dimensional image. The display assembly according to the present disclosure achieves brightness uniformity among viewpoints through brightness distribution based on the proportion of viewpoint crosstalk. The display assembly according to the present disclosure achieves smooth motion parallax through real-time eye tracking and refreshing of corresponding viewpoint images. The display assembly according to the present disclosure achieves high quality and high clarity light field three-dimensional image by constraining the viewpoint crosstalk angle and corresponding number of viewpoints in a repeating unit, based on the condition of no cross-talk between the left eye and the right eye.

Figure 12:
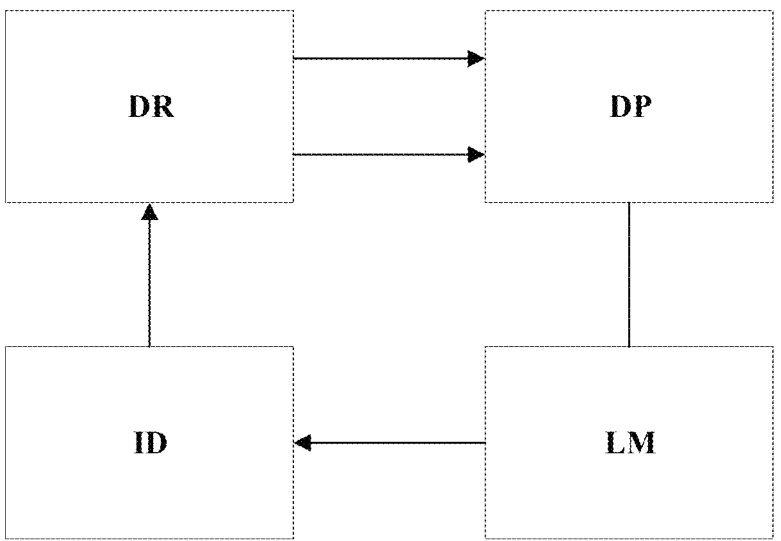
FIG. 12 is a schematic diagram illustrating the structure of a display assembly in some embodiments according to the present disclosure.

FIG. 12 is a schematic diagram illustrating the structure of a display assembly in some embodiments according to the present disclosure. Referring to FIG. 12, the display assembly in some embodiments includes a display panel DP, a light modulator LM, a driver DR, and an interactive device ID. Various appropriate display panels may be used in the present disclosure. Examples of appropriate display panels include liquid crystal display panels, organic light emitting diode display panels, mini light emitting diode display panels, and micro light emitting diode display panels. The light modulator LM in some embodiments includes various appropriate light modulating components. Examples of light modulating components include a plurality of lenses, gratings, and diffraction devices.

The interactive device ID is configured to track a viewer's eye (e.g., a viewer's pupil), and is configured to provide pixel algorithms based on the result of tracking the coordinates of the viewer's eye. For example, based on the coordinate of the viewer's eye, the interactive device ID is configured to determine a corresponding subpixel, light emitted from which can enter the viewer's eye at a position having the coordinate determined by the interactive device ID. Alternatively, based on the coordinate of the viewer's eye, the interactive device ID is configured to determine the corresponding subpixel and one or more subpixels adjacent to the corresponding subpixel. As the viewer's eye moves, the interactive device ID continues to determine a corresponding subpixel based on the new position of the viewer's eye. The corresponding subpixel (or the corresponding subpixel and the one or more subpixels adjacent to the corresponding subpixel) is configured to emit light for viewing by the viewer's eye as it moves.

In one example, the interactive device ID is configured to determine a coordinate of the viewer's pupil; determine a position of a corresponding subpixel, light emitted from which can enter the viewer's pupil at a position having the coordinate. The interactive device ID is configured to transmit information comprising the position of the corresponding subpixel to the driver DR, and the driver DR is configured to transmit timing signals such as gate scanning timing signals and data timing signals to the display panel DP. The display panel DP is configured to emit light in the corresponding subpixel. Optionally, the display panel DP is configured to emit light in the corresponding subpixel and one or more subpixels adjacent to the corresponding subpixel.

The driver DR is configured to provide driving timing signals (including gate scanning timing signals and data timing signals) to the display panel DP. The gate scanning timing signals and the data timing signals are configured to control the gate driving circuit (e.g., a gate-on-array) and the data driving circuit to transmit gate scanning signals and data signals in a manner to drive light emission in the corresponding subpixel and one or more subpixels adjacent to the corresponding subpixel. In some embodiments, the driver DR includes a timing controller configured to control the timing and synchronization of signals such as data signals. In some embodiments, the timing controller receives input signals from a signal source (e.g., a data source), and generates output signals that control the timing and sequencing of display data. The timing controller may include various components such as a clock generator, a buffer, and a control logic circuitry. Optionally, the timing controller is further configured to perform dynamic frame rate control, automatic phase adjustment, and low-power operation. To ensure compatibility with various display interfaces and systems, timing controllers may also support multiple input and output formats, including analog and digital signals.

Figures 13A, 13B, 13C:
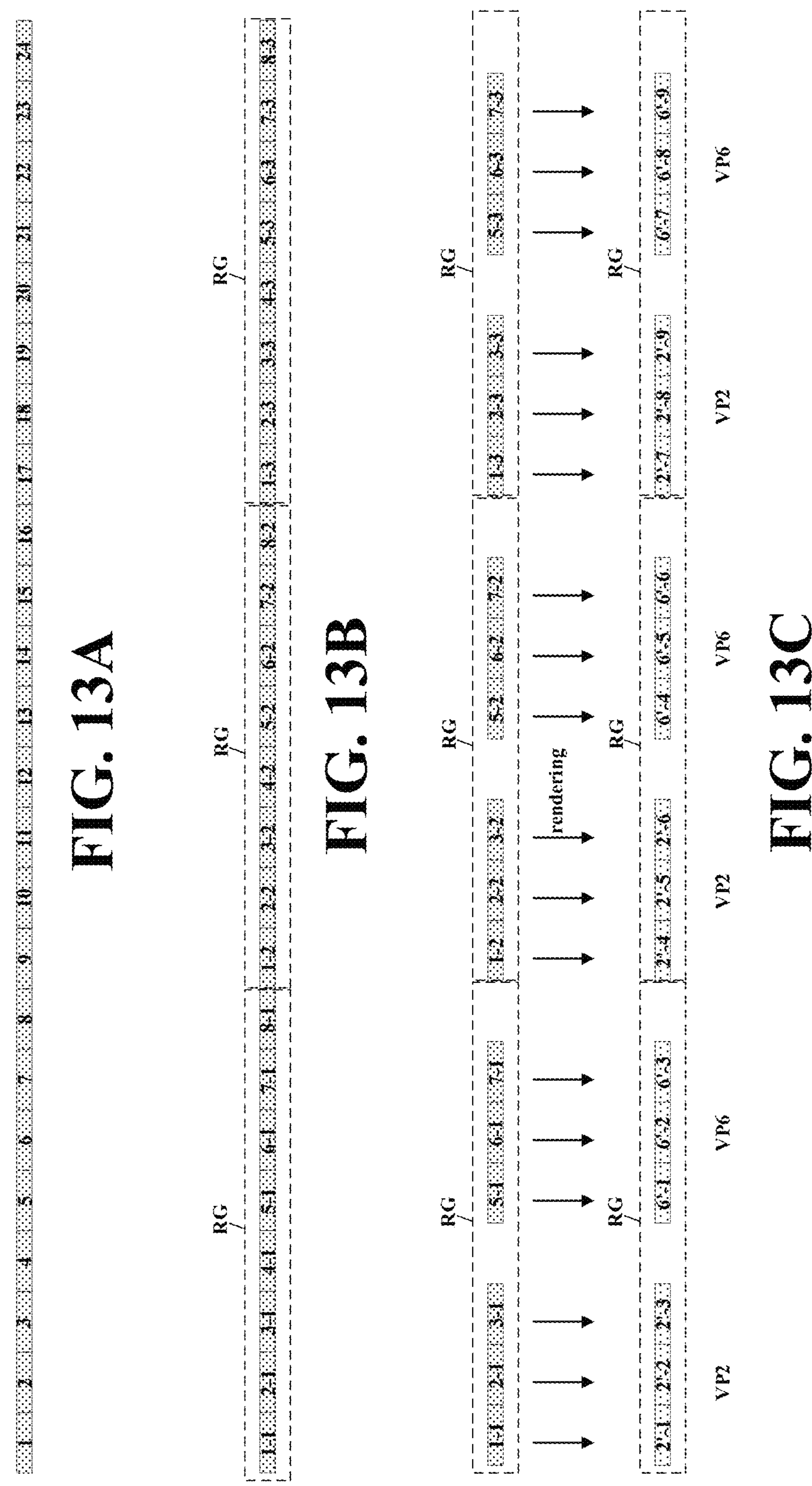
FIG. 13A to FIG. 13E illustrate a method of operating a display assembly in some embodiments according to the present disclosure.

In another aspect, the present disclosure provides a method of operating a display assembly. FIG. 13A to FIG. 13E illustrate a method of operating a display assembly in some embodiments according to the present disclosure. Referring to FIG. 13A, N number of subpixels (e.g., subpixels annotated as 1 to 24) are depicted, N being an integer greater than 2. The N number of subpixels may be subpixels of a plurality of pixels. For example, the 24 subpixels may be subpixels of 6 pixels, each of the 6 pixels including 4 subpixels. In one example, the retina resolution of a human eye is equivalent to the N number of subpixels (e.g., 6 pixels or 24 subpixels). The retina resolution thus includes information from the N number of subpixels (e.g., 24 subpixels).

Referring to FIG. 13B, in some embodiments, the N number of subpixels are grouped into I number of groups RG, I being an integer greater than 1, e.g., 2, 3, 4, 5, 6, 7, 8, 9, or 10. In some embodiments, a respective group of the I number of groups RG includes J number of subpixels, J being an integer greater than 1. In one example, each of the I number of groups RG includes a same number of subpixels, and J=N/I. In some embodiments, the respective group of the I number of groups corresponds to J number of viewpoints, and a respective subpixel in the respective group corresponds to a respective viewpoint of the J number of viewpoints. In some embodiments, a respective viewpoint of the J number of viewpoints corresponds to I number of subpixels from the I number of groups, respectively.

In the example depicted in FIG. 13B, I=3. The 24 subpixels are grouped into 3 groups, each group including 8 subpixels. In one example, the respective group of the I number of groups corresponds to 8 viewpoints, and each subpixel in the respective group corresponding to a respective viewpoint of the 8 viewpoints. For example, the first group includes subpixels 1-1, 2-1, 3-1, 4-1, 5-1, 6-1, 7-1, and 8-1. The second group includes subpixels 1-2, 2-2, 3-2, 4-2, 5-2, 6-2, 7-2, and 8-2. The third group includes subpixels 1-3, 2-3, 3-3, 4-3, 5-3, 6-3, 7-3, and 8-3. Subpixels 1-1, 1-2, 1-3 correspond to viewpoint 1. Subpixels 2-1, 2-2, 2-3 correspond to viewpoint 2. Subpixels 3-1, 3-2, 3-3 correspond to viewpoint 3. Subpixels 4-1, 4-2, 4-3 correspond to viewpoint 4. Subpixels 5-1, 5-2, 5-3 correspond to viewpoint 5. Subpixels 6-1, 6-2, 6-3 correspond to viewpoint 6. Subpixel 7-1, 7-2, 7-3 correspond to viewpoint 7. Subpixels 8-1, 8-2, 8-3 correspond to viewpoint 8.

In the display assembly and method depicted in FIG. 13B, the angular resolution of the display assembly is the J number of subpixels, and the spatial resolution of the display assembly is 1. Thus, the resolution of viewpoints the display assembly decreases as compared to the display assembly depicted in FIG. 13A. Because of the reduction in the resolution of viewpoints, it may lead to grainy feeling when a viewer is viewing a three-dimensional image displayed by the display assembly.

Figures 13D, 13E:
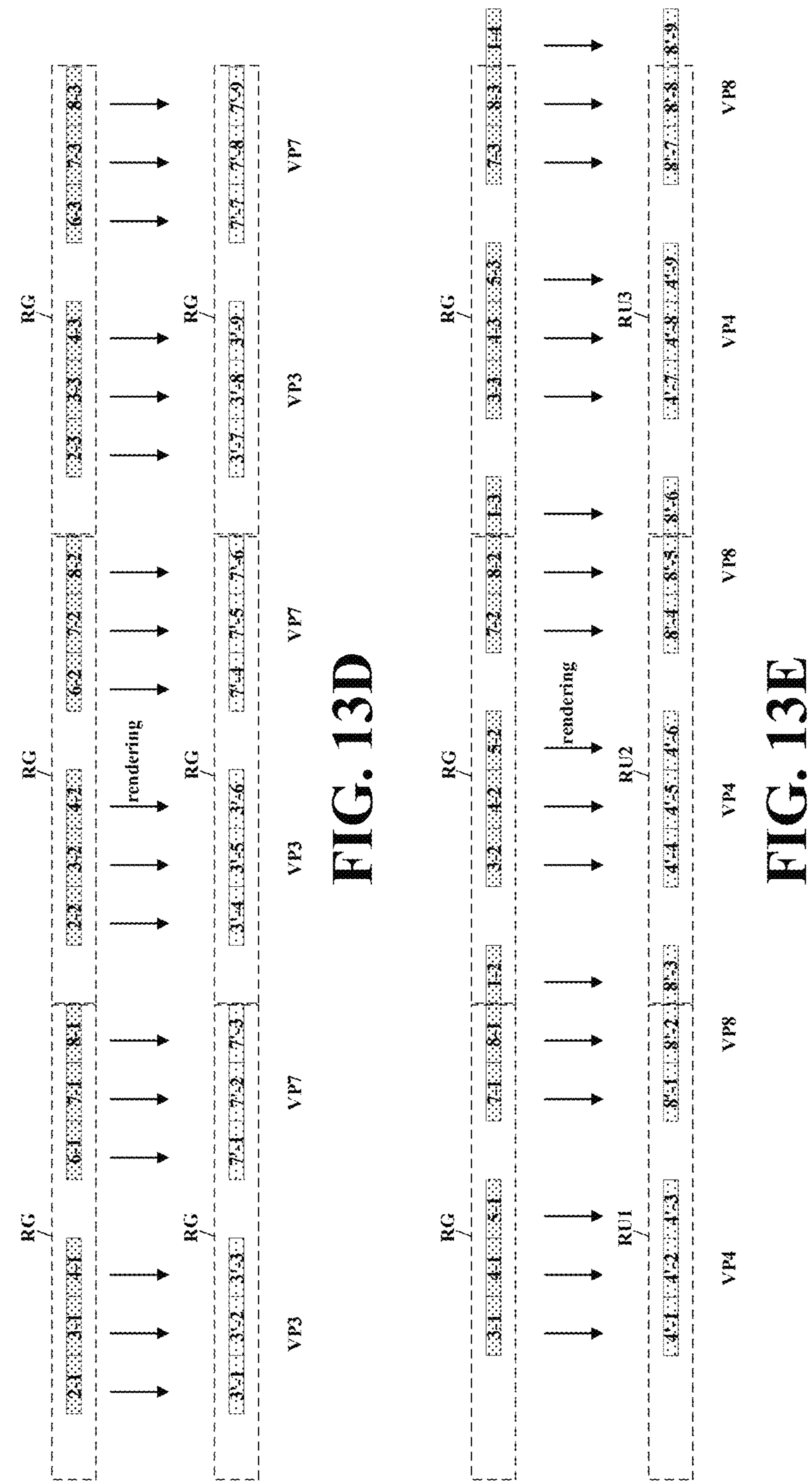

The inventors of the present disclosure discover that, surprisingly and unexpectedly, the grainy feeling in viewer's viewing experience can be significantly reduced or eliminated in the display assembly according to the present disclosure. Referring to FIG. 13C to FIG. 13E, in some embodiments, the method of operating the display assembly includes, with respect to a respective viewpoint (e.g., with respect to a j-th viewpoint of the J number of viewpoints corresponding to the J number of subpixels in the respective group. I≤j≤J), rendering K number of subpixel images corresponding to K number of subpixels in the respective group of the I number of groups; and providing the K number of subpixel images to the respective viewpoint, K being an integer greater than 1.

In some embodiments, the K number of subpixels include a subpixel corresponding to the respective viewpoint, and one or more subpixels corresponding to one or more viewpoints adjacent to the respective viewpoint, respectively. Optionally, the K number of subpixels include a subpixel corresponding to the j-th viewpoint, and at least one of a subpixel corresponding to the (j−1)-th viewpoint or a subpixel corresponding to the (j+1)-th viewpoint. In examples as depicted in FIG. 13C to FIG. 13E, the K number of subpixels include a subpixel corresponding to the j-th viewpoint, a subpixel corresponding to the (j−1)-th viewpoint, and a subpixel corresponding to the (j+1-th viewpoint. In one example, the method of operating the display assembly includes, with respect to a j-th viewpoint of the J number of viewpoints corresponding to the J number of subpixels in the respective group, rendering at least three subpixel images corresponding to three subpixels in the respective group of the I number of groups; and providing three subpixel images to the respective viewpoint, wherein the three subpixels including a subpixel corresponding to the j-th viewpoint, a subpixel corresponding to the (j−1)-th viewpoint, and a subpixel corresponding to the (j+1)-th viewpoint.

FIG. 13C shows an example with respect to viewpoint 2 VP2 and viewpoint 6 VP6. In one example, the right eye of a viewer is at the viewpoint 2 VP2 and the left eye of the viewer is at the viewpoint 6 VP6. FIG. 13C illustrates three groups of subpixels. With respect to the viewpoint 2 VP2, the method includes rendering a subpixel image 2'-2 corresponding to a subpixel 2-1 in the first group of subpixels, a subpixel image 2'-1 corresponding to a subpixel 1-1 in the first group of subpixels, and a subpixel image 2'-3 corresponding to a subpixel 3-1 in the first group of subpixels; and providing the subpixel image 2'-2, the subpixel image 2'-1, and the subpixel image 2'-3 to the viewpoint 2 VP2. As discussed, the subpixel 2-1 corresponds to the viewpoint 2 VP2, the subpixel 1-1 corresponds to viewpoint 1, and the subpixel 3-1 corresponds to viewpoint 3.

With respect to the viewpoint 2 VP2, the method further includes rendering a subpixel image 2'-5 corresponding to a subpixel 2-2 in the second group of subpixels, a subpixel image 2'-4 corresponding to a subpixel 1-2 in the second group of subpixels, and a subpixel image 2'-6 corresponding to a subpixel 3-2 in the second group of subpixels; and providing the subpixel image 2'4, the subpixel image 2'-5, and the subpixel image 2'-6 to the viewpoint 2 VP2. As discussed, the subpixel 2-2 corresponds to the viewpoint 2 VP2, the subpixel 1-2 corresponds to the viewpoint 1, and the subpixel 3-2 corresponds to the viewpoint 3.

With respect to the viewpoint 2 VP2, the method further includes rendering a subpixel image 2'-8 corresponding to a subpixel 2-3 in the third group of subpixels, a subpixel image 2'-7 corresponding to a subpixel 1-3 in the third group of subpixels, and a subpixel image 2'-9 corresponding to a subpixel 3-3 in the third group of subpixels; and providing the subpixel image 2'-7, the subpixel image 2'-8, and the subpixel image 2'-9 to the viewpoint 2 VP2. As discussed, the subpixel 2-3 corresponds to the viewpoint 2 VP2, the subpixel 1-3 corresponds to the viewpoint 1, and the subpixel 3-3 corresponds to the viewpoint 3.

Accordingly, the resolution of viewpoints with respect to the respective viewpoint increases from I number of subpixels to (I*K) number of viewpoints. The viewpoint resolution compensation leads to an increase of K time in the resolution of viewpoints. The grainy feeling in viewing the three-dimensional image displayed by the display assembly can be significantly reduced or eliminated. Referring to FIG. 13C, with respect to the viewpoint 2 VP2, the resolution of viewpoints increases from 3 subpixels to 9 subpixels.

With respect to the viewpoint 6 VP6, the method includes rendering a subpixel image 6'-2 corresponding to a subpixel 6-1 in the first group of subpixels, a subpixel image 6'-1 corresponding to a subpixel 5-1 in the first group of subpixels, and a subpixel image 6'-3 corresponding to a subpixel 7-1 in the first group of subpixels; and providing the subpixel image 6'-2, the subpixel image 6'-1, and the subpixel image 6'-3 to the viewpoint 6 VP6. As discussed, the subpixel 6-1 corresponds to the viewpoint 6 VP6, the subpixel 5-1 corresponds to viewpoint 5, and the subpixel 7-1 corresponds to viewpoint 7.

With respect to the viewpoint 6 VP6, the method further includes rendering a subpixel image 6'-5 corresponding to a subpixel 6-2 in the second group of subpixels, a subpixel image 6'-4 corresponding to a subpixel 5-2 in the second group of subpixels, and a subpixel image 6'-6 corresponding to a subpixel 7-2 in the second group of subpixels; and providing the subpixel image 6'4, the subpixel image 6'-5, and the subpixel image 6'-6 to the viewpoint 6 VP6. As discussed, the subpixel 6-2 corresponds to the viewpoint 6 VP6, the subpixel 5-2 corresponds to the viewpoint 5, and the subpixel 7-2 corresponds to the viewpoint 7.

With respect to the viewpoint 6 VP6, the method further includes rendering a subpixel image 6'-8 corresponding to a subpixel 6-3 in the third group of subpixels, a subpixel image 6'-7 corresponding to a subpixel 5-3 in the third group of subpixels, and a subpixel image 6'-9 corresponding to a subpixel 7-3 in the third group of subpixels; and providing the subpixel image 6'-7, the subpixel image 6'-8, and the subpixel image 6'-9 to the viewpoint 6 VP6. As discussed, the subpixel 6-3 corresponds to the viewpoint 6 VP6, the subpixel 5-3 corresponds to the viewpoint 5, and the subpixel 7-3 corresponds to the viewpoint 7.

Accordingly, with respect to the viewpoint 6 VP6, the resolution of viewpoints increases from 3 subpixels to 9 subpixels.

FIG. 13D shows an example with respect to viewpoint 3 VP3 and viewpoint 7 VP7. In one example, the right eye of a viewer is at the viewpoint 3 VP3 and the left eye of the viewer is at the viewpoint 7 VP7. FIG. 13D illustrates three groups of subpixels. With respect to the viewpoint 3 VP3, the method includes rendering a subpixel image 3'-2 corresponding to a subpixel 3-1 in the first group of subpixels, a subpixel image 3'-1 corresponding to a subpixel 2-1 in the first group of subpixels, and a subpixel image 3'-3 corresponding to a subpixel 4-1 in the first group of subpixels; and providing the subpixel image 3'-2, the subpixel image 3'-1, and the subpixel image 3'-3 to the viewpoint 3 VP3. As discussed, the subpixel 3-1 corresponds to the viewpoint 3 VP3, the subpixel 2-1 corresponds to viewpoint 2, and the subpixel 4-1 corresponds to viewpoint 4.

With respect to the viewpoint 3 VP3, the method further includes rendering a subpixel image 3'-5 corresponding to a subpixel 3-2 in the second group of subpixels, a subpixel image 3'4 corresponding to a subpixel 2-2 in the second group of subpixels, and a subpixel image 3'-6 corresponding to a subpixel 4-2 in the second group of subpixels; and providing the subpixel image 3'-4, the subpixel image 3'-5, and the subpixel image 3'-6 to the viewpoint 3 VP3. As discussed, the subpixel 3-2 corresponds to the viewpoint 3 VP3, the subpixel 2-2 corresponds to the viewpoint 2, and the subpixel 4-2 corresponds to the viewpoint 4.

With respect to the viewpoint 3 VP3, the method further includes rendering a subpixel image 3'-8 corresponding to a subpixel 3-3 in the third group of subpixels, a subpixel image 3'-7 corresponding to a subpixel 2-3 in the third group of subpixels, and a subpixel image 3'-9 corresponding to a subpixel 4-3 in the third group of subpixels; and providing the subpixel image 3'-7, the subpixel image 3'-8, and the subpixel image 3'-9 to the viewpoint 3 VP3. As discussed, the subpixel 3-3 corresponds to the viewpoint 3 VP3, the subpixel 2-3 corresponds to the viewpoint 2, and the subpixel 4-3 corresponds to the viewpoint 4.

Accordingly, the resolution of viewpoints with respect to the respective viewpoint increases from 1 number of subpixels to (I*K) number of viewpoints. The viewpoint resolution compensation leads to an increase of K time in the resolution of viewpoints. The grainy feeling in viewing the three-dimensional image displayed by the display assembly can be significantly reduced or eliminated. Referring to FIG. 13D, with respect to the viewpoint 3 VP3, the resolution of viewpoints increases from 3 subpixels to 9 subpixels.

With respect to the viewpoint 7 VP7, the method includes rendering a subpixel image 7'-2 corresponding to a subpixel 7-1 in the first group of subpixels, a subpixel image 7'-1 corresponding to a subpixel 6-1 in the first group of subpixels, and a subpixel image 7'-3 corresponding to a subpixel 8-1 in the first group of subpixels; and providing the subpixel image 7'-2, the subpixel image 7'-1, and the subpixel image 7'-3 to the viewpoint 7 VP7. As discussed, the subpixel 7-1 corresponds to the viewpoint 7 VP7, the subpixel 6-1 corresponds to viewpoint 6, and the subpixel 8-1 corresponds to viewpoint 8.

With respect to the viewpoint 7 VP7, the method further includes rendering a subpixel image 7'-5 corresponding to a subpixel 7-2 in the second group of subpixels, a subpixel image 7'-4 corresponding to a subpixel 6-2 in the second group of subpixels, and a subpixel image 7'-6 corresponding to a subpixel 8-2 in the second group of subpixels; and providing the subpixel image 7'-4, the subpixel image 7'-5, and the subpixel image 7'-6 to the viewpoint 7 VP7. As discussed, the subpixel 7-2 corresponds to the viewpoint 7 VP7, the subpixel 6-2 corresponds to the viewpoint 6, and the subpixel 8-2 corresponds to the viewpoint 8.

With respect to the viewpoint 7 VP7, the method further includes rendering a subpixel image 7'-8 corresponding to a subpixel 7-3 in the third group of subpixels, a subpixel image 7'-7 corresponding to a subpixel 6-3 in the third group of subpixels, and a subpixel image 7'-9 corresponding to a subpixel 8-3 in the third group of subpixels; and providing the subpixel image 7'-7, the subpixel image 7'-8, and the subpixel image 7'-9 to the viewpoint 7 VP7. As discussed, the subpixel 7-3 corresponds to the viewpoint 7 VP7, the subpixel 6-3 corresponds to the viewpoint 6, and the subpixel 8-3 corresponds to the viewpoint 8.

Accordingly, with respect to the viewpoint 7 VP7, the resolution of viewpoints increases from 3 subpixels to 9 subpixels.

FIG. 13E shows an example with respect to viewpoint 4 VP4 and viewpoint 8 VP8. In one example, the right eye of a viewer is at the viewpoint 4 VP4 and the left eye of the viewer is at the viewpoint 8 VP8. FIG. 13E illustrates three groups of subpixels. With respect to the viewpoint 4 VP4, the method includes rendering a subpixel image 4'-2 corresponding to a subpixel 4-1 in the first group of subpixels, a subpixel image 4'-1 corresponding to a subpixel 3-1 in the first group of subpixels, and a subpixel image 4'-3 corresponding to a subpixel 5-1 in the first group of subpixels; and providing the subpixel image 4'-2, the subpixel image 4'-1, and the subpixel image 4'-3 to the viewpoint 4 VP4. As discussed, the subpixel 4-1 corresponds to the viewpoint 4 VP4, the subpixel 3-1 corresponds to viewpoint 3, and the subpixel 5-1 corresponds to viewpoint 5.

With respect to the viewpoint 4 VP4, the method further includes rendering a subpixel image 4'-5 corresponding to a subpixel 4-2 in the second group of subpixels, a subpixel image 4'-4 corresponding to a subpixel 3-2 in the second group of subpixels, and a subpixel image 4'-6 corresponding to a subpixel 5-2 in the second group of subpixels; and providing the subpixel image 4'-4, the subpixel image 4'-5, and the subpixel image 4'-6 to the viewpoint 4 VP4. As discussed, the subpixel 4-2 corresponds to the viewpoint 4 VP4, the subpixel 3-2 corresponds to the viewpoint 3, and the subpixel 5-2 corresponds to the viewpoint 5.

With respect to the viewpoint 4 VP4, the method further includes rendering a subpixel image 4'-8 corresponding to a subpixel 4-3 in the third group of subpixels, a subpixel image 4'-7 corresponding to a subpixel 3-3 in the third group of subpixels, and a subpixel image 4'-9 corresponding to a subpixel 5-3 in the third group of subpixels; and providing the subpixel image 4'-7, the subpixel image 4'-8, and the subpixel image 4'-9 to the viewpoint 4 VP4. As discussed, the subpixel 4-3 corresponds to the viewpoint 4 VP4, the subpixel 3-3 corresponds to the viewpoint 3, and the subpixel 5-3 corresponds to the viewpoint 5.

Accordingly, the resolution of viewpoints with respect to the respective viewpoint increases from I number of subpixels to (I*K) number of viewpoints. The viewpoint resolution compensation leads to an increase of K time in the resolution of viewpoints. The grainy feeling in viewing the three-dimensional image displayed by the display assembly can be significantly reduced or eliminated. Referring to FIG. 13E, with respect to the viewpoint 4 VP4, the resolution of viewpoints increases from 3 subpixels to 9 subpixels.

With respect to the viewpoint 8 VP8, the method includes rendering a subpixel image 8'-2 corresponding to a subpixel 8-1 in the first group of subpixels, a subpixel image 8'-1 corresponding to a subpixel 7-1 in the first group of subpixels, and a subpixel image 8'-3 corresponding to a subpixel 1-2 in the second group of subpixels; and providing the subpixel image 8'-2, the subpixel image 8'-1, and the subpixel image 8'-3 to the viewpoint 8 VP8. As discussed, the subpixel 8-1 corresponds to the viewpoint 8 VP8, the subpixel 7-1 corresponds to viewpoint 7, and the subpixel 1-2 in the second group of subpixels corresponds to viewpoint 1.

With respect to the viewpoint 8 VP8, the method further includes rendering a subpixel image 8'-5 corresponding to a subpixel 8-2 in the second group of subpixels, a subpixel image 8'-4 corresponding to a subpixel 7-2 in the second group of subpixels, and a subpixel image 8'-6 corresponding to a subpixel 1-3 in the third group of subpixels; and providing the subpixel image 8'-4, the subpixel image 8'-5, and the subpixel image 8'-6 to the viewpoint 8 VP8. As discussed, the subpixel 8-2 corresponds to the viewpoint 8

VP8, the subpixel 7-2 corresponds to the viewpoint 7, and the subpixel 1-3 corresponds to the viewpoint 1.

With respect to the viewpoint 8 VP8, the method further includes rendering a subpixel image 8'-8 corresponding to a subpixel 8-3 in the third group of subpixels, a subpixel image 8'-7 corresponding to a subpixel 7-3 in the third group of subpixels, and a subpixel image 8'-9 corresponding to a subpixel 1-4 in an adjacent first group of subpixels; and providing the subpixel image 8'-7, the subpixel image 8'-8, and the subpixel image 8'-9 to the viewpoint 8 VP8. As discussed, the subpixel 8-3 corresponds to the viewpoint 8 VP8, the subpixel 7-3 corresponds to the viewpoint 7, and the subpixel 1-4 corresponds to the viewpoint 1.

Accordingly, with respect to the viewpoint 8 VP8, the resolution of viewpoints increases from 3 subpixels to 9 subpixels.

In some embodiments, the I number of groups includes a main group corresponding to a main lobe region and one or more side groups corresponding to one or more side lobe regions of the display assembly, with respect to the J number of viewpoints. For example, the second group of subpixels may correspond to a main lobe region, and the first group of subpixels and the third group of subpixels may correspond to two $1^{st}$ order side lobe regions. As used herein, the term "main lobe region" refers to a region that provides the highest angular resolution and luminance, where the majority of light emitted from one or more subpixels in the main group of subpixels is directed toward the viewer's eye(s) with minimal deviation from the intended viewing direction. Typically, the main lobe region is the region where the viewer can see the best quality images with a wide viewing angle. As used herein, the term "side lobe region" refers to a region that that provides lower angular resolution and luminance, where the light emitted from the one or more side groups is refracted (e.g., by one or more lenses) away from the intended viewing direction. Typically, the side lobe region is the region where the viewer's visual perception of the displayed image is compromised due to a reduction in contrast, sharpness, and color saturation.

In some embodiments, the display assembly includes an interactive device, a driver coupled to the interactive device, and a display panel coupled to the driver. In some embodiments, the interactive device is configured to determine a coordinate of the viewer's pupil; determine a respective viewpoint corresponding to the coordinate of the viewer's pupil and a position of a respective subpixel in a respective group corresponding to the respective viewpoint.

In some embodiments, the driver is configured to receive from the interactive device information on the coordinate of the viewer's pupil, the respective viewpoint corresponding to the coordinate of the viewer's pupil, and the position of the respective subpixel in the respective group corresponding to the respective viewpoint; generate driving timing signals based on the information; and provide the timing signals to the display panel.

In some embodiments, the display panel is configured to receive the driving timing signals from the driver; generate gate scanning signals and data signals based on the driving timing signals.

In some embodiments, the display panel includes a plurality of repeating units. In some embodiments, a respective repeating unit of the plurality of repeating units includes N number of subpixels. In some embodiments, the N number of subpixels are grouped into I number of groups RG, I being an integer greater than 1, e.g., 2, 3, 4, 5, 6, 7, 8, 9, or 10. In some embodiments, a respective group of the I number of groups RG includes J number of subpixels, J being an integer greater than 1. In one example, each of the I number of groups RG includes a same number of subpixels, and J=N/I. In some embodiments, the respective group of the I number of groups corresponds to J number of viewpoints, and a respective subpixel in the respective group corresponds to a respective viewpoint of the J number of viewpoints. In some embodiments, a respective viewpoint of the J number of viewpoints corresponds to I number of subpixels from the 1 number of groups, respectively.

In some embodiments, the display assembly includes a processor. In one example, the processor is a component of the driver. In another example, the processor is a component of the interactive device, in some embodiments, the processor is configured to, with respect to a respective viewpoint (e.g., with respect to a j-th viewpoint of the J number of viewpoints corresponding to the J number of subpixels in the respective group, I≤j≤J), render K number of subpixel images corresponding to K number of subpixels in the respective group of the I number of groups. In some embodiments, the display panel is configured to display the K number of subpixel images and provide the K number of subpixel images to the respective viewpoint, K being an integer greater than 1.

In some embodiments, the K number of subpixels include a subpixel corresponding to the respective viewpoint, and one or more subpixels corresponding to one or more viewpoints adjacent to the respective viewpoint, respectively. Optionally, the K number of subpixels include a subpixel corresponding to the j-th viewpoint, and at least one of a subpixel corresponding to the (j−1)-th viewpoint or a subpixel corresponding to the (j+1)-th viewpoint. In one example, the K number of subpixels include a subpixel corresponding to the j-th viewpoint, a subpixel corresponding to the (j−1)-th viewpoint, and a subpixel corresponding to the (j+1)-th viewpoint.

In some embodiments, the processor is configured to, with respect to a j-th viewpoint of the J number of viewpoints corresponding to the J number of subpixels in the respective group, render at least three subpixel images corresponding to three subpixels in the respective group of the I number of groups. In some embodiments, the display panel is configured to display the at least three subpixel images, and provide the at least three subpixel images to the respective viewpoint, wherein the three subpixels including a subpixel corresponding to the j-th viewpoint, a subpixel corresponding to the (j−1)-th viewpoint, and a subpixel corresponding to the (j+1)-th viewpoint.

Figure 14:
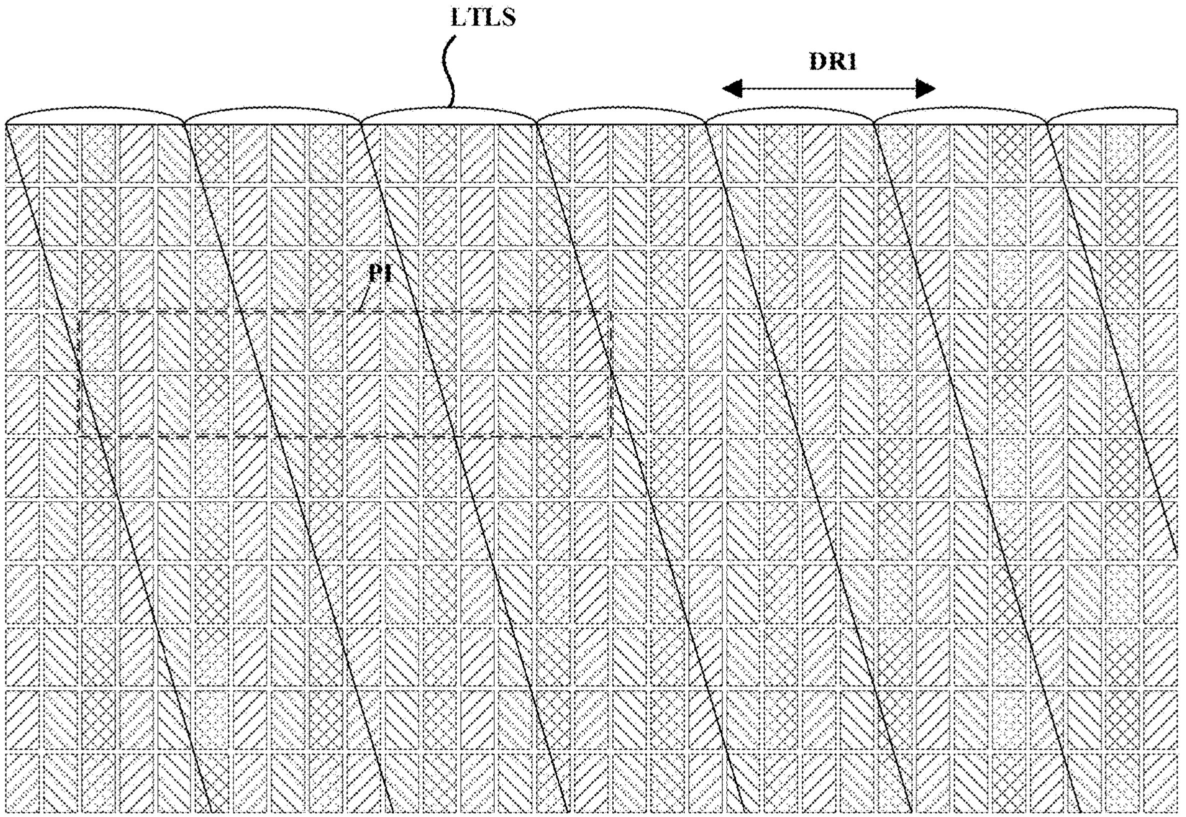
FIG. 14 is a schematic diagram showing distribution of pixel islands in some embodiments according to the present disclosure.

In some embodiments, a respective group of the I number of groups is a respective pixel island of the plurality of pixel islands depicted in FIG. 1 to FIG. 4. FIG. 14 is a schematic diagram showing distribution of pixel islands in some embodiments according to the present disclosure. Referring to FIG. 14, in some embodiments, the display assembly includes a plurality of pixel islands PI. In some embodiments, I number of pixel islands of the plurality of pixel islands PI arranged along a first direction DR1 are I number of groups of subpixels discussed in FIG. 13B to FIG. 13E. For example, in one example, I=3, and three pixel islands of the plurality of pixel islands PI arranged along the first direction DR1 are three groups of subpixels. In some embodiments, a respective pixel islands of the plurality of pixel islands PI includes J number of subpixels, and a respective group of the I number of groups includes J number of subpixels. In the example depicted in FIG. 14, J=28.

Figure 15:
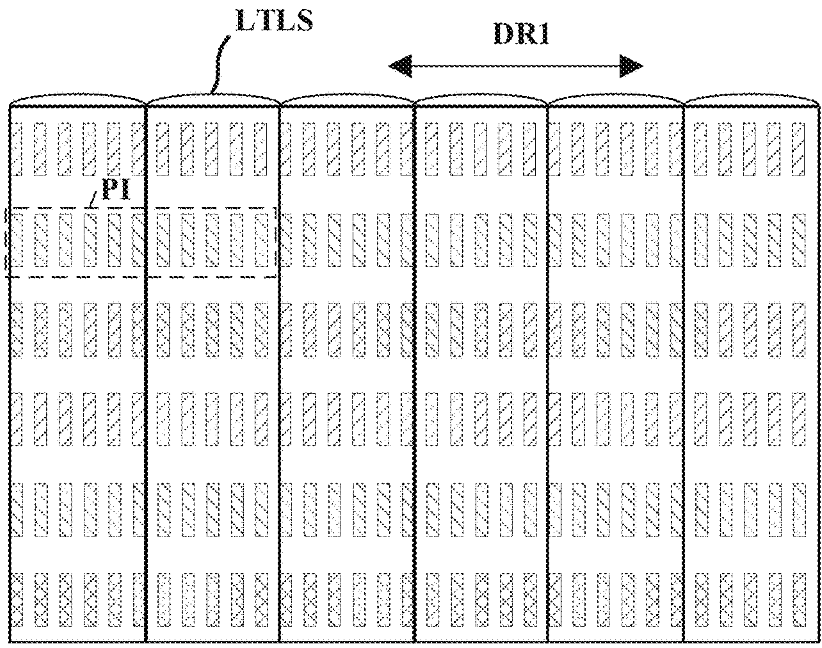
FIG. 15 is a schematic diagram showing distribution of pixel islands in some embodiments according to the present disclosure.

FIG. 15 is a schematic diagram showing distribution of pixel islands in some embodiments according to the present disclosure. Referring to FIG. 15, a respective pixel islands of the plurality of pixel islands PI includes J number of subpixels, and a respective group of the I number of groups includes J number of subpixels. In the example depicted in FIG. 14, J=11.

In some embodiments, J number of subpixels correspond to J number of viewpoints.

Referring to FIG. 12, the interactive device ID is configured to track a viewer's eye (e.g., a viewer's pupil), and is configured to provide pixel algorithms based on the result of trucking the coordinates of the viewer's eye. The processor is configured to render subpixel images corresponding to subpixels. In some embodiments, the display assembly further includes a camera configured to capture images of the viewer's eye, with a frequency F. In some embodiments, the coordinates of the viewer's eye are recorded at a plurality of time intervals. A respective time interval of the plurality of time intervals is 1/F.

In some embodiments, when the viewer's eye does not suddenly change viewing direction, the processor is configured to render subpixel images substantially at the plurality of time intervals; and the viewer is continuously viewing the subpixel images rendered at the plurality of time intervals.

In some embodiments, the viewer's eye suddenly changes viewing direction, it takes additional time for the processor to render the subpixel images due to a delay in response to the change in viewing direction. In some embodiments, a time interval for rendering subpixel images when the viewer's eye suddenly changes viewing direction is Tr=1/F+Tc+Tp+Td, wherein F is a frequency at which images of the viewer's eye are captured, Tc is a period of time required for calculating a coordinate of the viewer's eye when the viewer's eye suddenly changes viewing direction, Tp is a period of time required for calculating pixel algorithm by the processor, and Td is a period of time required for driving the display panel to display the subpixel image.

In some embodiments, the display assembly according to the present disclosure can support a smooth viewing of three-dimensional image when the viewer's eye moves at a speed of $$v = \frac{(EB - Eet)}{Tr},$$

wherein Tr stands for the time interval for rendering subpixel images when the viewer's eye suddenly changes viewing direction. EB stands for a critical angle at which the viewer's eye cannot perceive a change in viewpoint while watching a three-dimensional image while the viewer's eye is moving; and Eet stands for an accuracy error when tracking the coordinates of the viewer's eye. As used herein, the term accuracy error refers to a difference between a true value of a measurement and a recorded value of the measurement due to various factors that may affect the measurement. Examples of the factors include instrument errors, environmental conditions, and/or human errors.

Referring to FIG. 14 and FIG. 15, the larger the number of subpixels in a respective pixel island of the plurality of pixel islands PI, the fewer number of pixel islands in the display panel. This results in a decreased resolution of viewpoints, and a relatively lower resolution of viewpoints leads to grainy feeling. In some related display assemblies, the respective pixel island includes only two subpixels corresponding to two viewpoints, to ensure the resolution of viewpoints. However, this leads to cross-talk between the binocular viewpoints and results in double image and dizziness for the viewer. The inventors of the present disclosure discover a novel display assembly that not only has an increased number of viewpoints but also sufficiently maintains the resolution of viewpoints.

Figure 16:
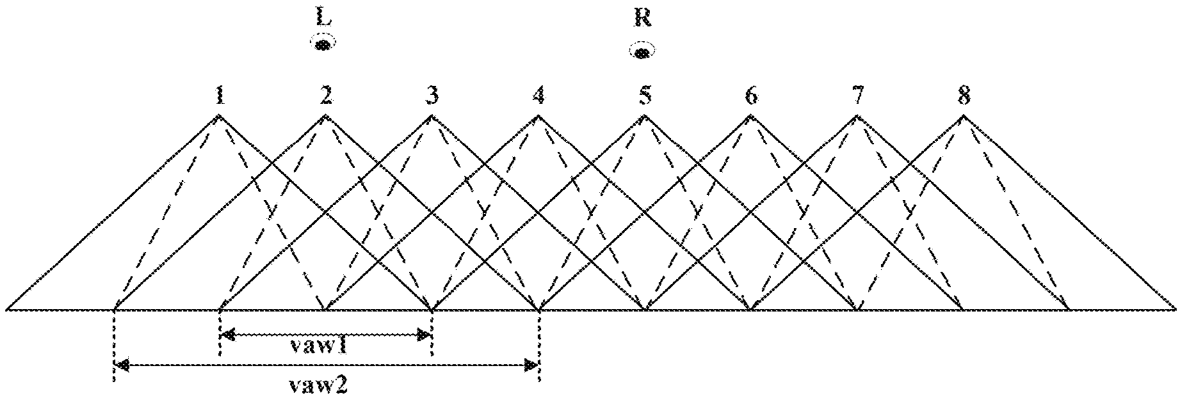
FIG. 16 illustrates two different viewpoint angular widths in some embodiments according to the present disclosure.

FIG. 16 illustrates two different viewpoint angular widths in some embodiments according to the present disclosure. Referring to FIG. 16, a total of eight viewpoints 1-8 are shown. In some embodiments, each viewpoint corresponds to a subpixel, and a respective group of the I number of groups includes eight subpixels corresponding to the eight viewpoints. In some embodiments, a respective pixel island of the plurality of pixel islands includes eight subpixels corresponding to eight viewpoints. The dotted line in FIG. 16 shows a first viewpoint angular width vaw1. As shown in FIG. 16, when a respective viewpoint has a first viewpoint angular width vaw1, a viewer's eye at a respective viewpoint cannot view rendered subpixel images of adjacent subpixels corresponding to adjacent viewpoints. For example, when the respective viewpoint has a first viewpoint angular width vaw1, a viewer's left eye L at viewpoint 2 cannot view rendered subpixel images of adjacent subpixels corresponding to viewpoints 1 and 3; and a viewer's right eye R at viewpoint 5 cannot view rendered subpixel images of adjacent subpixels corresponding to viewpoints 4 and 6. Thus, the first viewpoint angular width vaw1 is a lower limit for viewpoint resolution compensation. For example, no effective viewpoint resolution compensation can be achieved when the viewpoint angular width is equal to or less than the first viewpoint angular width vaw1.

Referring to FIG. 16 again, the solid line in FIG. 16 shows a second viewpoint angular width vaw2. When a respective viewpoint has a second viewpoint angular width vaw2, the viewer's left eye cannot view rendered subpixel images corresponding to the viewer's right eye, and the viewer's right eye cannot view rendered subpixel images corresponding to the viewer's left eye. For example, rendered subpixel images corresponding to viewpoints 1-3 are rendered subpixel images for the viewer's left eye, and rendered subpixel images corresponding to viewpoints 4-6 are rendered subpixel images for the viewer's right eye. When the viewer's left eye L is at viewpoint 2, the viewer's left eye L cannot view rendered subpixel images corresponding to viewpoints 4-6. When the viewer's right eye R is at viewpoint 5, the viewer's right eye R cannot view rendered subpixel images corresponding to viewpoints 1-3. Thus, the second viewpoint angular width vaw2 is an upper limit for viewpoint resolution compensation in order to avoid cross-talk between the viewer's left eye L and the viewer's right eye R. For example, when the viewpoint angular width is equal to or less than the second viewpoint angular width vaw2, no cross-talk is present. When the viewpoint angular width is greater than the second viewpoint angular width vaw2, cross-talk between the viewer's left eye L and the viewer's right eye R is present.

Figure 17:
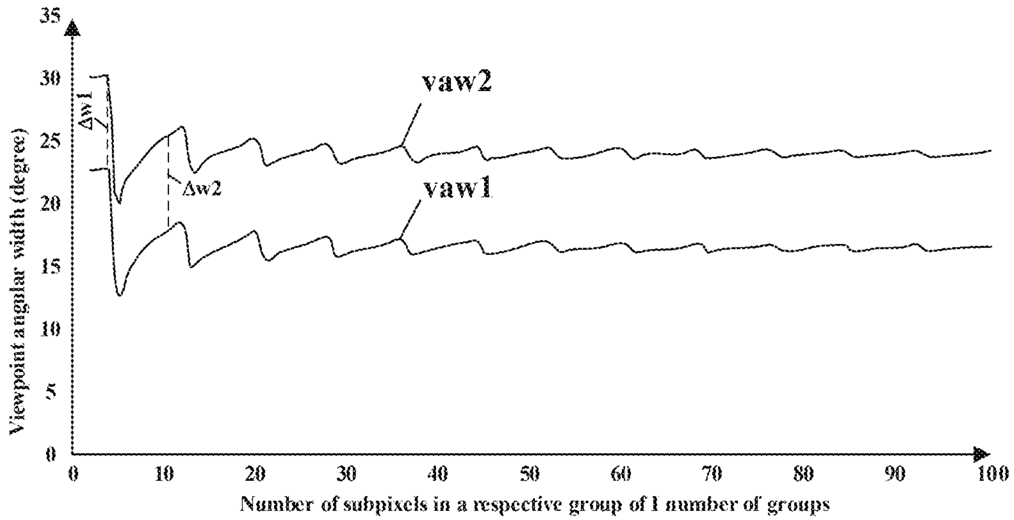
FIG. 17 shows correlation between a number of subpixels in a respective group of I number of groups and a first viewpoint angular width or a second viewpoint angular width in a display assembly in some embodiments according to the present disclosure.

FIG. 17 shows correlation between a number of subpixels in a respective group of I number of groups and a first viewpoint angular width or a second viewpoint angular width in a display assembly in some embodiments according to the present disclosure. As shown in FIG. 17, the first viewpoint angular width vaw1 changes with the number of subpixels in a respective group of I number of groups (or the number of subpixels in a respective pixel island of the plurality of pixel islands); the second viewpoint angular width vaw2 changes with the number of subpixels in a respective group of I number of groups (or the number of subpixels in a respective pixel island of the plurality of pixel islands); and a difference between the first viewpoint angular width vaw1 and the second viewpoint angular width vaw2 changes with the number of subpixels in a respective group of I number of groups (or the number of subpixels in a respective pixel island of the plurality of pixel islands). The larger the difference between the first viewpoint angular width vaw1 and the second viewpoint angular width vaw2, the larger the range of viewpoint angles in which viewpoint resolution compensation is achieved and cross-talk between the viewer's left eye and the viewer's right eye is avoided. Thus, the larger the difference between the first viewpoint angular width vaw1 and the second viewpoint angular width vaw2, the better the viewing experience.

As depicted in FIG. 17, a largest difference Δw1 may be found between the first viewpoint angular width vaw1 and the second viewpoint angular width vaw2 when the number of subpixels in a respective group of I number of groups (or the number of subpixels in a respective pixel island of the plurality of pixel islands) is 4. A second largest difference Δw2 may be found between the first viewpoint angular width vaw1 and the second viewpoint angular width vaw2 when the number of subpixels in a respective group of I number of groups (or the number of subpixels in a respective pixel island of the plurality of pixel islands) is 11.

In some embodiments, a respective pixel islands of the plurality of pixel islands PI includes J number of subpixels, and a respective group of the I number of groups includes J number of subpixels. In some embodiments, J is a number such that angles of view of visual regions of the plurality of pixel islands can be spliced with each other to achieve an overall angle of view close to or equal to 180° on a display side of the display assembly (as depicted in FIG. 6 to FIG. 10).

In some embodiments, in order to have a display assembly in which angles of view of visual regions of the plurality of pixel islands can be spliced with each other to achieve an overall angle of view close to or equal to 180° on a display side of the display assembly, J is a number that satisfies the following conditions. Referring to FIG. 15 as an example for illustration purpose, a respective pixel island of the plurality of pixel islands PI includes J number of subpixels. Light emitted from the respective pixel island is refracted by m number of lens of the plurality of lenticular lenses LTLS. Optionally, J and m are coprime. Optionally, M is greater than 1.

Referring to FIG. 5, in some embodiments, the respective pixel island of the plurality of pixel islands includes a non-luminous area NLA exists between two adjacent subpixels. In some embodiments, the non-luminous area NLA forms a divergent non-visual region DNVR on the display side through the lens layer LL. In some embodiments, in a cross-section perpendicular to the light exit surface 130 of the display panel DP and parallel to a set direction sDR, a ratio of a total width of J number of subpixels in the respective pixel island to a total width of J number of subpixels and non-luminous areas in the respective pixel island is greater than 1/M. Optionally, the ratio of the total width of J number of subpixels in the respective pixel island to a total width of J number of subpixels and non-luminous areas in the respective pixel island is a multiple of 1/M, e.g., 2/M.

Referring to FIG. 15, when J=11, the angles of view of visual regions of the plurality of pixel islands can be spliced with each other to achieve an overall angle of view close to or equal to 180° on a display side of the display assembly. In the example depicted in FIG. 15, M=2, and J=11, thus M and J are coprime, M is greater than 1.

In an alternative embodiments, J=4. Referring to FIG. 15, when J=4, M=1, thus J and M are not coprime, and M is not greater than 1. When J=4, the angles of view of visual regions of the plurality of pixel islands cannot be spliced with each other to achieve an overall angle of view close to or equal to 180° on a display side of the display assembly.

Referring to FIG. 17, in some embodiments. J is a number in a range that renders angles of view of visual regions of the plurality of pixel islands can be spliced with each other to achieve an overall angle of view close to or equal to 180° on a display side of the display assembly, and J is a number in the range that renders a difference between the first viewpoint angular width vaw1 and the second viewpoint angular width vaw2 the largest. For example, referring to FIG. 17, the largest difference Δw1 may be found between the first viewpoint angular width vaw1 and the second viewpoint angular width vaw2 when the number of subpixels in a respective group of I number of groups (or the number of subpixels in a respective pixel island of the plurality of pixel islands) is 4. However, when J=4, the angles of view of visual regions of the plurality of pixel islands cannot be spliced with each other to achieve an overall angle of view close to or equal to 180° on a display side of the display assembly. Referring to FIG. 17, the second largest difference Δw2 may be found between the first viewpoint angular width vaw1 and the second viewpoint angular width vaw2 when the number of subpixels in a respective group of I number of groups (or the number of subpixels in a respective pixel island of the plurality of pixel islands) is 11. When J=11, the angles of view of visual regions of the plurality of pixel islands can be spliced with each other to achieve an overall angle of view close to or equal to 180° on a display side of the display assembly.

Referring to FIG. 16 again, in some embodiments according to the present disclosure, the method of operating the display assembly includes rendering subpixel images corresponding to subpixels 1-3, and providing the subpixel images to the viewpoint 2. The method of operating the display assembly further includes rendering subpixel images corresponding to subpixels 4-6, and providing the subpixel images to the viewpoint 5. The resolution of viewpoint 2 and the resolution of viewpoint 5 increase to three times of the original resolution, respectively. At the same time, rendered subpixel images corresponding to to subpixels 4-6 are not viewed by the left eye L, and rendered subpixel images corresponding to subpixels 1-3 are not viewed by the right eye R.

In some embodiments, a resolution of retina is X number of subpixels, and a respective group of the I number of groups includes J number of subpixels. Absent of the subpixel image rendering and resolution compensation according to the present disclosure, a viewpoint angular width is CA/NV, wherein CA stands for a view angle of the main lobe region, and NV stands for a total number of viewpoints in the main lobe region. With the subpixel image rendering and resolution compensation according to the present disclosure, the viewpoint angular width is K (CA/NV), wherein K≥roundup (J/X), wherein roundup stands for an operation of rounding (J/X) to the nearest integer that is greater than or equal to (J/X). In one example, J=15, X=10, K≥2, thus the method of operating the display assembly includes rendering subpixel images corresponding to at least two subpixels, and providing the subpixel images to a respective viewpoint.

As discussed in connection with FIG. 13C to FIG. 13E, in some embodiments, the method of operating the display assembly includes, with respect to a respective viewpoint (e.g., with respect to a j-th viewpoint of the J number of viewpoints corresponding to the J number of subpixels in the respective group, $1 \leq j \leq J$), rendering K number of subpixel images corresponding to K number of subpixels in the respective group of the I number of groups; and providing the K number of subpixel images to the respective viewpoint, K being an integer greater than 1. Referring to FIG. 16, in one example, a luminance value of a subpixel image corresponding to subpixel 1 at the viewpoint 2 is lower than a peak luminance value of a subpixel image corresponding to subpixel 1, e.g., lower than a luminance value of subpixel image corresponding to subpixel 1 at the viewpoint 1. Similarly, a luminance value of a subpixel image corresponding to subpixel 3 at the viewpoint 2 is lower than a peak luminance value of a subpixel image corresponding to subpixel 3, e.g., lower than a luminance value of subpixel image corresponding to subpixel 3 at the viewpoint 3. Therefore, in some embodiments, the K number of subpixel images corresponding to K number of subpixels are K number of subpixel images having weighted luminance values. Optionally, a respective weighted luminance value of a respective subpixel image of the K number of subpixel images is equal to w*L, wherein w stands for a respective weight, L stands for a luminance value of the respective subpixel image at the respective viewpoint.

Optionally, $$w = \frac{Lp}{L};$$

wherein Lp stands for a respective peak luminance value of the respective subpixel image.

The inventors of the present disclosure discover that the display assembly and the operating method according to the present disclosure can achieve viewpoint resolution compensation and avoid cross-talk between the viewer's left eye and the viewer's right eye. The inventors of the present disclosure discover that the smaller the viewpoint angular width, the less the cross-talk between the viewer's left eye and the viewer's right eye. However, the greater the viewpoint angular width, the better the viewpoint resolution compensation. The inventors of the present disclosure discover that the viewpoint angular width should be chosen to minimize or avoid the cross-talk between the viewer's left eye and the viewer's right eye while at the same time achieving the greatest viewpoint resolution compensation.

Figure 18:
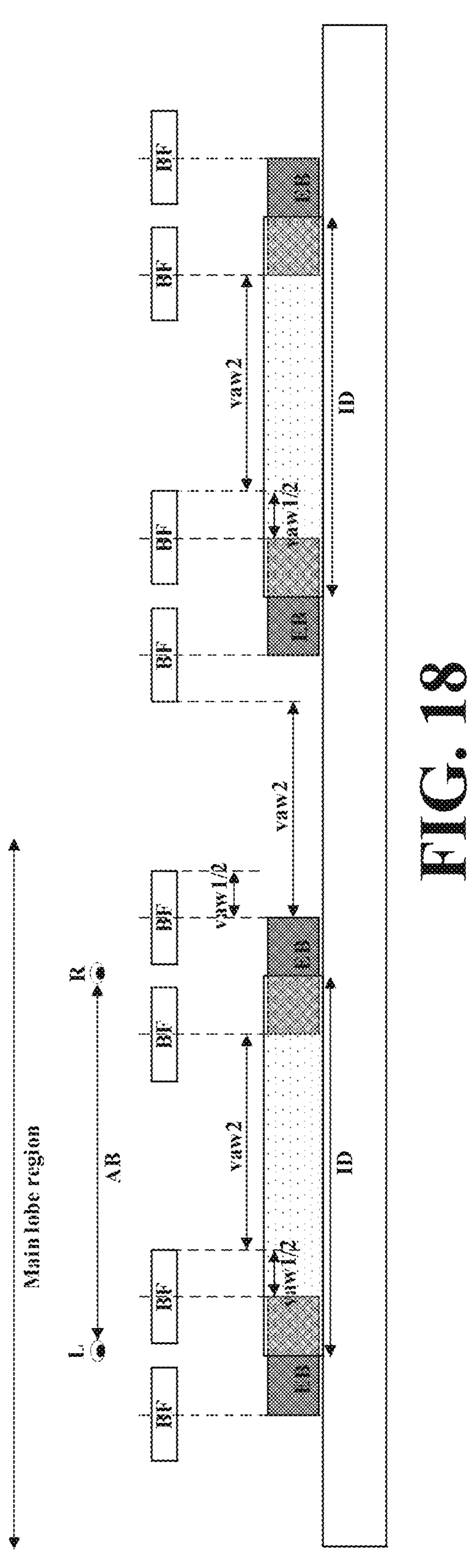
FIG. 18 is a schematic diagram illustrating an angle between a left eye and a right eye of a viewer in some embodiments according to the present disclosure.

FIG. 18 is a schematic diagram illustrating an angle between a left eye and a right eye of a viewer in some embodiments according to the present disclosure. An interpupillary distance ID between pupils of a left eye L and a right eye R of a viewer is denoted in FIG. 18. Referring to FIG. 18, in some embodiments, an angle AB between the left eye L and the right eye R of a viewer in a main lobe region with respect to the plurality of lenticular lenses LTLS (e.g., an included angle between a line connecting the left eye L and a point on the plurality of lenticular lenses LTLS and equi-distant to the left eye L and the right eye R and a line connecting the right eye R and the point on the plurality of lenticular lenses LTLS and equi-distant to the left eye L and the right eye R) can be expressed as:

$$AB = \frac{EB}{2} + \frac{BF}{2} + vaw2 + \frac{EB}{2} = EB + \frac{BF}{2} + vaw2;$$

wherein EB stands for an angular width of an eye-box region, vaw2 stands for a second viewpoint angular width as discussed above, and BF stands for an angular width required for achieving the viewpoint resolution compensation. The second viewpoint angular width vaw2 is an upper limit of the viewpoint angular width of a respective viewpoint to avoid the cross-talk between the viewer's left eye L and the viewer's right eye R. For example, when the respective viewpoint has a second viewpoint angular width vaw2, the viewer's left eye L cannot view rendered subpixel images corresponding to the viewer's right eye R, and the viewer's right eye R cannot view rendered subpixel images corresponding to the viewer's left eye L. When the respective viewpoint has a viewpoint angular width greater than the second viewpoint angular width vaw2, the cross-talk occurs, and the viewer's left eye L can at least partially view rendered subpixel images corresponding to the viewer's right eye R, and the viewer's right eye R can at least partially view rendered subpixel images corresponding to the viewer's left eye L.

In some embodiments, the angular width BF required for achieving the viewpoint resolution compensation is the first viewpoint angular width vaw1 discussed above. The first viewpoint angular width vaw1 is a lower limit of the viewpoint angular width of a respective viewpoint to achieve viewpoint resolution compensation. When the respective viewpoint has a first viewpoint angular width vaw1, a viewer's eye at a respective viewpoint cannot view rendered subpixel images of adjacent subpixels corresponding to adjacent viewpoints.

Figure 19:
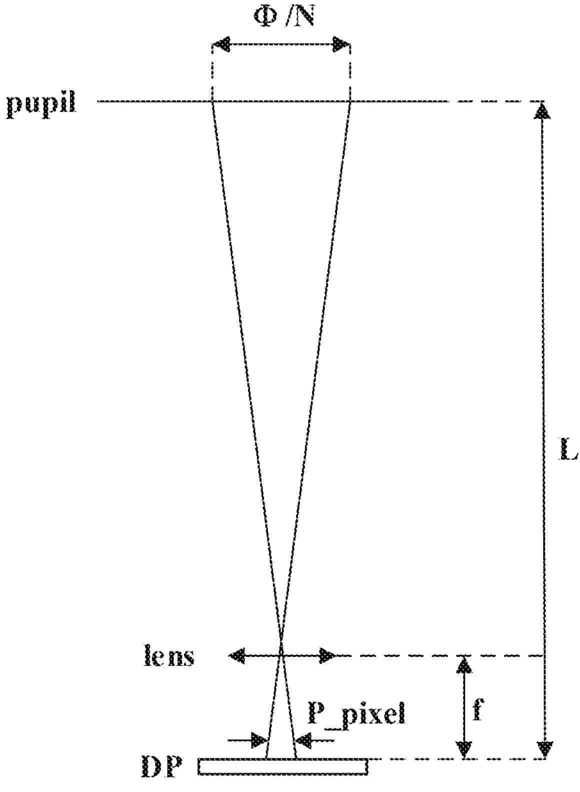
FIG. 19 is a model of a pupil of a human eye established according to some embodiments of the present disclosure.
Figure 20:
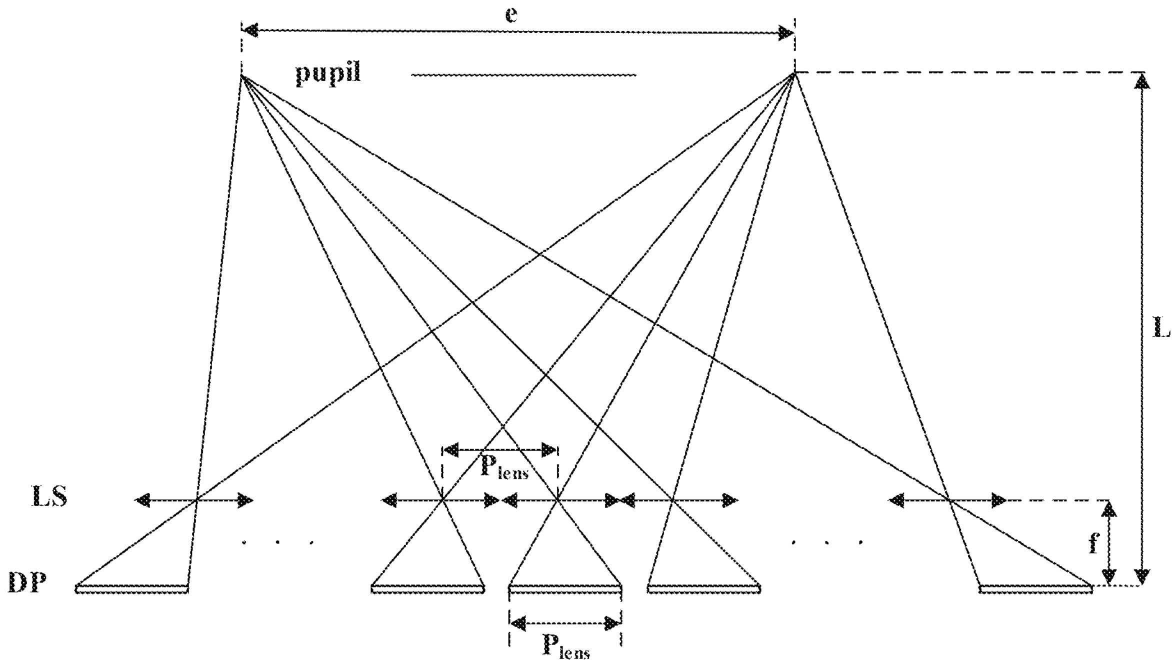
FIG. 20 is an eye movement range model established according to some embodiments of the present disclosure.

FIG. 19 is a model of a pupil of a human eye established according to some embodiments of the present disclosure. FIG. 20 is an eye movement range model established according to some embodiments of the present disclosure. Referring to FIG. 19, the number of viewpoints incident on a single pupil of the human eye is at least two, and a model in which the viewpoints fully fill the pupil of the human eye is established as follows:

$$\frac{\Phi/Y}{Psubpixel} = \frac{L}{f};$$

wherein φ is the pupil diameter, Y is the number of viewpoints that enter the pupil of the human eye, $P_{subpixel}$ is a pitch of subpixels, L is the distance from the plurality of lenticular lenses to the pupil, and f is the focal length of the plurality of lenticular lenses.

Referring to FIG. 5, an eye movement range model is established, in which EB stands for an angular width of an eye-box region, representing a movable range of the human eye. The premise of establishing the model here is that the pupil of the human eye is the light receiver instead of the human eye. Then the eye movement range model is:

$$\frac{Plens}{EB} = \frac{f}{L};$$

wherein EB stands for an angular width of an eye-box region, $P_{lens}$ stands for a pitch of the plurality of lenticular lenses. The angular width EB of an eye-box region can be calculated accordingly.

Figure 21:
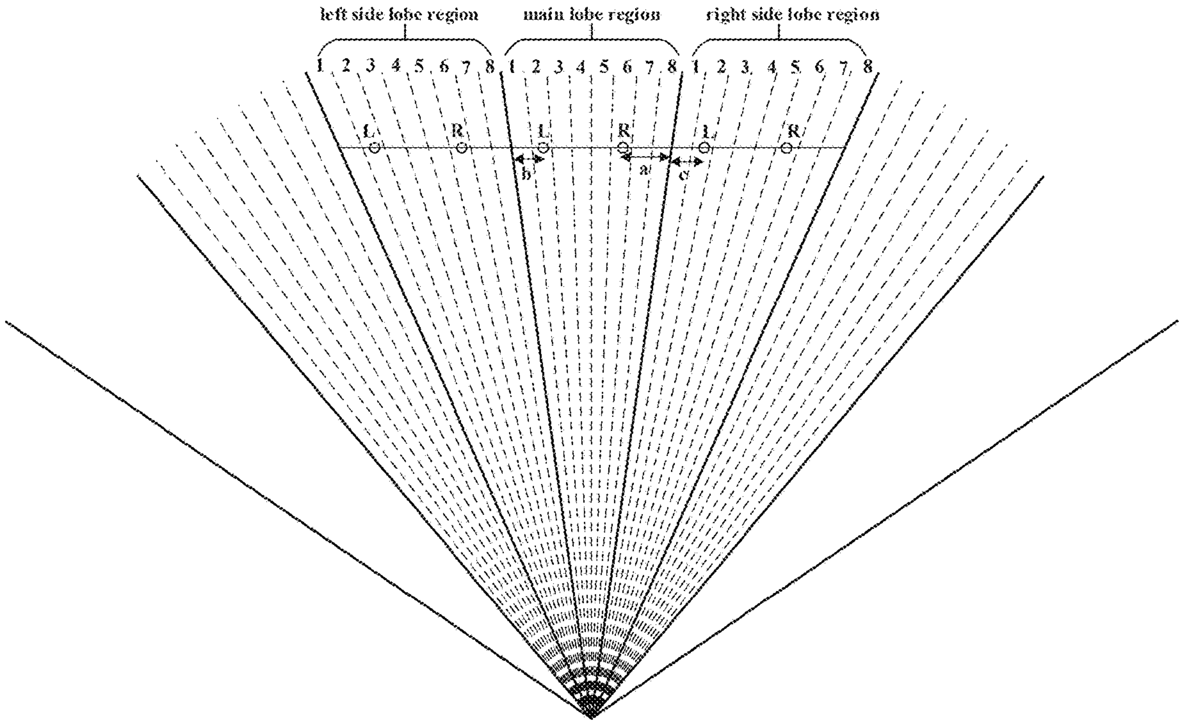
FIG. 21 is a schematic diagram illustrating a main lobe region and a plurality of side lobe region in some embodiments according to the present disclosure.

The inventors of the present disclosure discover that the viewing experience can be further improved if cross-talk between a main lobe region and an adjacent side lobe region can be avoided. FIG. 21 is a schematic diagram illustrating a main lobe region and a plurality of side lobe region in some embodiments according to the present disclosure. Referring to FIG. 21, a main lobe region, a left side lobe region, and a right side lobe region are denoted. In some embodiments, a view angle of the main lobe region is substantially the same as a+b+an angle between the left eye L and the right eye R of a viewer in a main lobe region with respect to the plurality of lenticular lenses LTLS (e.g., an included angle between a line connecting the left eye L and a point on the plurality of lenticular lenses LTLS and equi-distant to the left eye L and the right eye R and a line connecting the right eye R and the point on the plurality of lenticular lenses LTLS and equi-distant to the left eye L and the right eye R). Thus, (CA−AB)=a+c, wherein CA stands for a view angle of the main lobe region, AB stands for an angle between the left eye L and the right eye R of a viewer in the main lobe region with respect to the plurality of lenticular lenses LTLS (e.g., an included angle between a line connecting the left eye L and a point on the plurality of lenticular lenses LTLS and equi-distant to the left eye L and the right eye R and a line connecting the right eye R and the point on the plurality of lenticular lenses LTLS and equi-distant to the left eye L and the right eye R), a stands for an angle between the right eye R and a right edge of the main lobe region with respect to the plurality of lenticular lenses LTLS (e.g., an included angle between a line connecting the right eye R and a point on the plurality of lenticular lenses LTLS and equi-distant to the left eye L and the right edge of the main lobe region), and b stands for an angle between the left eye L and a left edge of the main lobe region with respect to the plurality of lenticular lenses LTLS (e.g., an included angle between a line connecting the left eye L and a point on the plurality of lenticular lenses LTLS and equi-distant to the left eye L and the left edge of the main lobe region).

In some embodiments, b is substantially the same as c, wherein c stands for an angle between a left eye in a right side lobe region and a left edge of the right side lobe region with respect to the plurality of lenticular lenses LTLS (e.g., an included angle between a line connecting the left eye L and a point on the plurality of lenticular lenses LTLS and equi-distant to the left eye L and the left edge of the right side lobe region). As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value. Accordingly, in some embodiments, (CA−AB) is substantially the same as (a+b). Referring to FIG. 21, (a+b) is substantially the same as an angle AB between the left eye L and the right eye R of a viewer with respect to the plurality of lenticular lenses LTLS (e.g., an included angle between a line connecting the left eye L and a point on the plurality of lenticular lenses LTLS and equi-distant to the left eye L and the right eye R and a line connecting the right eye R and the point on the plurality of lenticular lenses LTLS and equi-distant to the left eye L and the right eye R).

$$AB = \frac{EB}{2} + \frac{BF}{2} + vaw2 + \frac{EB}{2} = EB + \frac{BF}{2} + vaw2;$$

$$(CA - AB) \cong AB = EB + \frac{BF}{2} + vaw2.$$

In some embodiments, to avoid cross-talk between a main lobe region and an adjacent side lobe region, $$2 * vaw2 \leq 2 * \left(\frac{CA}{2} - EB - \frac{BF}{2}\right).$$

Figure 22:
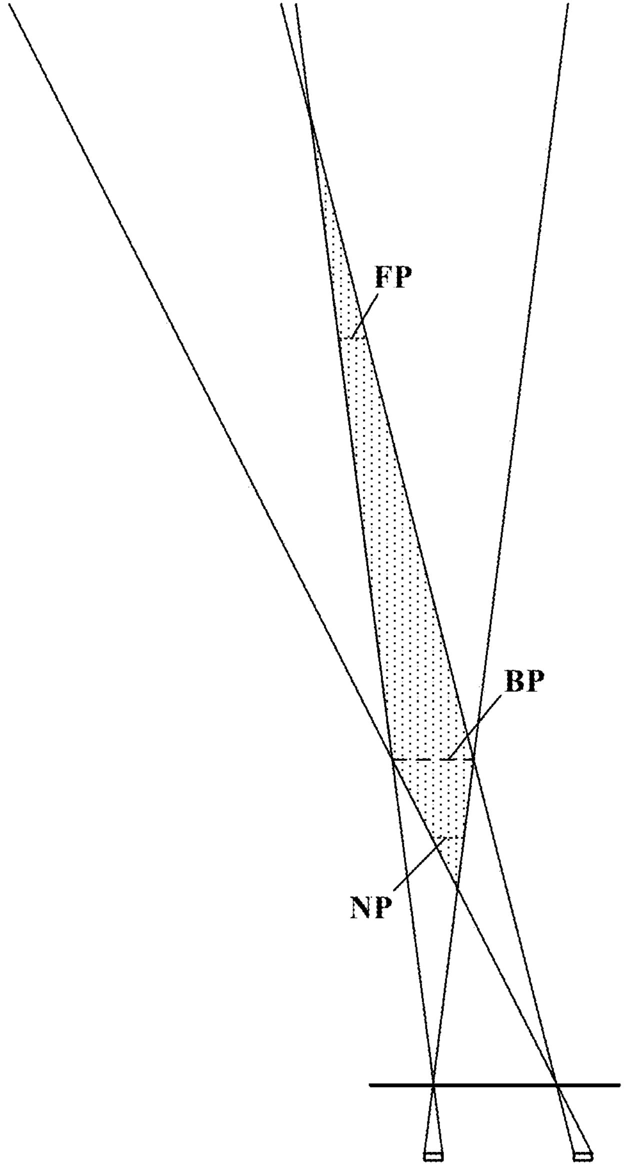
FIG. 22 is a schematic diagram illustrating an eye box region in some embodiments according to the present disclosure.

FIG. 22 is a schematic diagram illustrating an eye box region in some embodiments according to the present disclosure. Referring to FIG. 22, an eye-box region is denoted by the shaded area. In the eye-box region, the viewer may view the image on different planes. For example, the viewer may view the image on a near image plane NP which is closer to the display panel, or on a far image plane FP which is distal to the display panel, or on a best viewing plane BP which provides the best viewing experience. When a viewer views the image on the best viewing plane BP, the image is substantially free of distortion, color error, or other defects. In some embodiments, the angle between the left eye L and the right eye R on the best viewing plane BP with respect to the plurality of lenticular lenses LTLS (e.g., an included angle between a line connecting the left eye L and a point on the plurality of lenticular lenses LTLS and equi-distant to the let eye L and the right eye R and a line connecting the right eye R and the point on the plurality of lenticular lenses LTLS and equi-distant to the left eye L and the right eye R) is θm.

In some embodiments, when a viewer views the image on the best viewing plane BP, CA=2*θm. Thus, $$2 * vaw2 \leq 2 * \left(\theta m - EB - \frac{BF}{2}\right).$$

The inventors of the present disclosure discover that the display assembly according to the present disclosure allows the viewer to view the three-dimensional image at a range of viewing distances, e.g., ranging from the near image plane NP to the far image plane FP. When the viewer is viewing the image on the near image plane NP, the angle between the left eye L and the right eye R increases, and a number of viewpoints between the left eye L and the right eye R increases. A number of viewpoints in the main lobe region and outside the region between the let eye L and the right eye R decreases. Thus, the second viewpoint angular width (the upper limit) is accomplished with fewer number of viewpoints. In some embodiments, when the viewer is viewing the image on the near image plane NP, $$2 * vaw2' \leq 2 * \left(CA - \theta n - EB - \frac{BF}{2}\right);$$

wherein vaw2' stands for the second viewpoint angular width when the viewer is viewing the image on the near image plane NP.

When the viewer is viewing the image on the far image plane FP, the angle between the left eye L and the right eye R decreases, and a number of viewpoints between the left eye L and the right eye R decreases. A number of viewpoints in the main lobe region and outside the region between the left eye L and the right eye R increases. Thus, the second viewpoint angular width (the upper limit) is accomplished with greater number of viewpoints. In some embodiments, when the viewer is viewing the image on the far image plane FP, $$2 * vaw2'' \leq 2 * \left(\theta f - EB - \frac{BF}{2}\right);$$

wherein vaw2" stands for the second viewpoint angular width when the viewer is viewing the image on the far image plane FP.

In some embodiments, to ensure the viewpoint angular width satisfies various image planes (including the near image plane NP, the far image plane FP, and the best viewing plane BP), $$2 * vaw2' \leq 2 * vaw2''; \text{ and}$$

$$CA = \theta n + \theta f.$$

The inventors of the present disclosure discover that when the pitch of the plurality of lenticular lenses is greater than a width of a retina, the plurality of lenticular lenses may be easily recognized by the human eye, resulting in a Moiré pattern. Accordingly, the pitch of the plurality of lenticular lenses is typically equal to or smaller than the width of a retina.

The smaller the pitch of the plurality of lenticular lenses, the smaller a corresponding focal length of the plurality of lenticular lenses. The focal length of the plurality of lenticular lenses can be expressed as:

$f=r/\Delta n$; wherein f stands for the focal length, r stands for a radius of a curvature of a respective lenticular lens of the plurality of lenticular lenses, and $\Delta n$ stands for a difference between refractive indexes of the plurality of lenticular lenses and air.

In some embodiments, the radius of a curvature of the respective lenticular lens of the plurality of lenticular lenses can be expresses as:

$$r = h/2 + \frac{D^2}{8 * h};$$

wherein D stands for a width of the respective lenticular lens of the plurality of lenticular lenses, and h stands for a sagitta of the respective lenticular lens of the plurality of lenticular lenses (a distance between a vertex of the respective lenticular lens of the plurality of lenticular lenses and a midpoint of the diameter of the respective lenticular lens of the plurality of lenticular lenses). Optionally. D is substantially the same as the pitch of the plurality of lenticular lenses.

A conic constant c of the respective lenticular lens of the plurality of lenticular lenses can be expressed as:

$D/h=c$; wherein c stands for a conic constant of the respective lenticular lens of the plurality of lenticular lenses, D stands for a width of the respective lenticular lens of the plurality of lenticular lenses, and h stands for a sagitta of the respective lenticular lens of the plurality of lenticular lenses (a distance between a vertex of the respective lenticular lens of the plurality of lenticular lenses and a midpoint of the diameter of the respective lenticular lens of the plurality of lenticular lenses). Optionally, D is substantially the same as the pitch of the plurality of lenticular lenses.

Accordingly, the focal length of the plurality of lenticular lenses can be expressed as:

$f=(1/2c+c/8)*D$; wherein c stands for a conic constant of the respective lenticular lens of the plurality of lenticular lenses, and D stands for a width of the respective lenticular lens of the plurality of lenticular lenses, and h stands for a sagitta of the respective lenticular lens of the plurality of lenticular lenses (a distance between a vertex of the respective lenticular lens of the plurality of lenticular lenses and a midpoint of the diameter of the respective lenticular lens of the plurality of lenticular lenses). Optionally, D is substantially the same as the pitch of the plurality of lenticular lenses.

Figure 23:
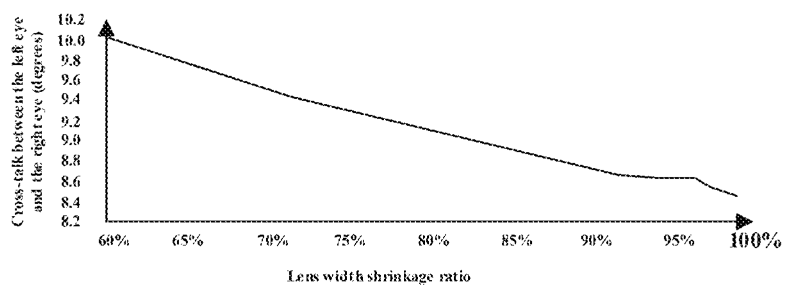
FIG. 23 shows a correlation between lens width shrinkage ratio and cross-talk between the left eye and the right eye in some embodiments according to the present disclosure.

FIG. 23 shows a correlation between lens width shrinkage ratio and cross-talk between the left eye and the right eye in some embodiments according to the present disclosure. As shown in FIG. 23, the higher the lens width shrinkage ratio, the less the cross-talk between the left eye and the right eye. The lens width shrinkage ratio is defined using a lens width equal to a width of a retina as a base value. The lens width shrinkage ratio is equal to a lens width divided by the base value. A lens width shrinkage ratio of 60% indicates the lens width is 60% of the width of a retina. As shown in FIG. 23, when the lens width shrinkage ratio is 80%, the cross-talk between the left eye and the right eye is 9.1 degrees. When the lens width shrinkage ratio is 60%, the cross-talk between the left eye and the right eye is 10.1 degrees. Optionally, the lens width shrinkage ratio is 1.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of operating a display assembly, comprising:

with respect to a respective viewpoint of J number of viewpoints corresponding to J number of subpixels in a respective group of I number of groups in a display panel, rendering K number of subpixel images corresponding to K number of subpixels in the respective group of the I number of groups; and providing the K number of subpixel images to the respective viewpoint, 1≤j≤J, K<J, and I, J, K being integers greater than 1;

wherein the respective group of the I number of groups corresponds to J number of viewpoints;

a respective subpixel in the respective group corresponds to a respective viewpoint of the J number of viewpoints; and a respective viewpoint of the J number of viewpoints corresponds to I number of subpixels from the I number of groups, respectively;

wherein the I number of groups includes a main group corresponding to a main lobe region and one or more side groups corresponding to one or more side lobe regions of the display assembly, with respect to the J number of viewpoints;

wherein a resolution of retina is X number of subpixels; and

K≥roundup (J/X), wherein roundup stands for an operation of rounding (J/X) to the nearest integer that is greater than or equal to (J/X).

2. The method of claim 1, wherein the K number of subpixels comprise a subpixel corresponding to the respective viewpoint, and one or more subpixels corresponding to one or more viewpoints adjacent to the respective viewpoint, respectively.

3. The method of claim 2, wherein the K number of subpixels include a subpixel corresponding to a j-th viewpoint, and at least one of a subpixel corresponding to a (j−1)-th viewpoint or a subpixel corresponding to the (j+1)-th viewpoint.

4. The method of claim 3, comprising:

with respect to a j-th viewpoint of the J number of viewpoints corresponding to the J number of subpixels in the respective group, rendering at least three subpixel images corresponding to three subpixels in the respective group of the I number of groups; and providing three subpixel images to the respective viewpoint;

wherein the three subpixels including a subpixel corresponding to the j-th viewpoint, a subpixel corresponding to a (j−1)-th viewpoint, and a subpixel corresponding to the (j+1)-th viewpoint.

5. The method of claim 1, wherein the K number of subpixel images corresponding to K number of subpixels are K number of subpixel images having weighted luminance values;

a respective weighted luminance value of a respective subpixel image of the K number of subpixel images is equal to w*L;

w stands for a respective weight; and

L stands for a luminance value of the respective subpixel image at the respective viewpoint.

6. The method of claim 5, wherein $$w = \frac{Lp}{L};$$

Lp stands for a respective peak luminance value of the respective subpixel image.

7. A method of operating a display assembly, comprising:

with respect to a respective viewpoint of J number of viewpoints corresponding to J number of subpixels in a respective group of I number of groups in a display panel, rendering K number of subpixel images corresponding to K number of subpixels in the respective group of the I number of groups; and providing the K number of subpixel images to the respective viewpoint, 1≤j≤J, K<J, and I, J, K being integers greater than 1;

wherein the respective group of the I number of groups corresponds to J number of viewpoints;

a respective subpixel in the respective group corresponds to a respective viewpoint of the J number of viewpoints; and a respective viewpoint of the J number of viewpoints corresponds to I number of subpixels from the I number of groups, respectively;

wherein a viewpoint angular width of the respective viewpoint is between a first viewpoint angular width and a second viewpoint angular width;

wherein, when the viewpoint angular width of the respective viewpoint is equal to or less than the first viewpoint angular width, a viewer's eye at a respective viewpoint cannot view rendered subpixel images of adjacent subpixels corresponding to adjacent viewpoints; and when the viewpoint angular width of the respective viewpoint is equal to or less than a second viewpoint angular width, a viewer's left eye cannot view rendered subpixel images corresponding to a viewer's right eye, and the viewer's right eye cannot view rendered subpixel images corresponding to the viewer's left eye.

8. The method of claim 7, wherein J is a number in a range that renders angles of view of visual regions of the I numbers of groups can be spliced with each other to achieve an overall angle of view close to or equal to 180° on a display side of the display assembly, and J is a number in the range that renders a difference between the first viewpoint angular width and the second viewpoint angular width the largest.

9. The method of claim 7, wherein $$2 * vaw2 \leq 2 * \left(\frac{CA}{2} - EB - \frac{BF}{2}\right);$$

vaw2 stands for the second viewpoint angular width;

CA stands for a view angle of a main lobe region;

EB stands for an angular width of an eye-box region; and

BF stands for the first viewpoint angular width.

10. The method of claim 9, wherein $$\frac{Plens}{EB} = \frac{f}{L};$$

$P_{lens}$ stands for a pitch of a plurality of lenticular lenses in the display assembly;

L is the distance from the plurality of lenticular lenses to a pupil of the viewer;

f is the focal length of the plurality of lenticular lenses.

11. The method of claim 7, when a viewer views the image on a best viewing plane, $$2 * vaw2 \leq 2 * \left(\theta m - EB - \frac{BF}{2}\right);$$

θm stands for an angle between the left eye L and the right eye R on the best viewing plane BP with respect to a plurality of lenticular lenses in the display assembly;

EB stands for an angular width of an eye-box region; and

BF stands for the first viewpoint angular width.

12. A display assembly, comprising a display panel, a processor, a light modulator, a driver, and an interactive device;

wherein the processor is configured to, with respect to a respective viewpoint of J number of viewpoints corresponding to J number of subpixels in a respective group of I number of groups in the display panel, render K number of subpixel images corresponding to K number of subpixels in the respective group of the I number of groups, $1 \leq j \leq J$, $K < J$, and I, J, K being integers greater than 1;

the display panel is configured to display the K number of subpixel images and provide the K number of subpixel images to the respective viewpoint;

wherein the respective group of the I number of groups corresponds to J number of viewpoints;

a respective subpixel in the respective group corresponds to a respective viewpoint of the J number of viewpoints; and a respective viewpoint of the J number of viewpoints corresponds to I number of subpixels from the I number of groups, respectively;

wherein the interactive device is configured to:

determine a coordinate of a viewer's pupil;

determine a position of a corresponding subpixel, light emitted from which can enter the viewer's pupil at a position having the coordinate; and transmit information comprising the position of the corresponding subpixel to the driver;

wherein the driver is configured to transmit timing signals to the display panel; and the display panel is configured to emit light in the corresponding subpixel and one or more subpixels adjacent to the corresponding subpixel.

13. The display assembly of claim 12, wherein the processor is configured to, with respect to a j-th viewpoint of the J number of viewpoints corresponding to the J number of subpixels in the respective group, render at least three subpixel images corresponding to three subpixels in the respective group of the I number of groups;

the display panel is configured to display the at least three subpixel images and provide the at least three subpixel images to the respective viewpoint;

wherein the at least three subpixels including a subpixel corresponding to the j-th viewpoint, a subpixel corresponding to a (j−1)-th viewpoint, and a subpixel corresponding to the (j+1)-th viewpoint.

14. The display assembly of claim 12, wherein the K number of subpixels comprise a subpixel corresponding to the respective viewpoint, and one or more subpixels corresponding to one or more viewpoints adjacent to the respective viewpoint, respectively.

15. The display assembly of claim 12, wherein the K number of subpixels include a subpixel corresponding to a j-th viewpoint, and at least one of a subpixel corresponding to a (j−1)-th viewpoint or a subpixel corresponding to the (j+1)-th viewpoint.

16. The display assembly of claim 12, wherein the K number of subpixel images corresponding to K number of subpixels are K number of subpixel images having weighted luminance values;

a respective weighted luminance value of a respective subpixel image of the K number of subpixel images is equal to w*L;

w stands for a respective weight; and

L stands for a luminance value of the respective subpixel image at the respective viewpoint.

17. The display assembly of claim 16, wherein $$w = \frac{Lp}{L};$$

Lp stands for a respective peak luminance value of the respective subpixel image.

* * * * *